(12) United States Patent
Ohta et al.

(10) Patent No.: US 7,111,705 B2
(45) Date of Patent: Sep. 26, 2006

(54) VIBRATION ISOLATING MOUNT DEVICE

(75) Inventors: Katsutoshi Ohta, Okayama (JP); Sumio Uchida, Okayama (JP); Tetsuya Miyake, Okayama (JP)

(73) Assignee: Kurashiki Kako Co., Ltd., Okayama (JP)

( * ) Notice: Subject to any disclaimer, the term of this patent is extended or adjusted under 35 U.S.C. 154(b) by 0 days.

(21) Appl. No.: 10/810,625

(22) Filed: Mar. 29, 2004

(65) Prior Publication Data
US 2005/0167898 A1    Aug. 4, 2005

(30) Foreign Application Priority Data

| Feb. 2, 2004 | (JP) | ............................. | 2004-025551 |
| Feb. 6, 2004 | (JP) | ............................. | 2004-030182 |
| Feb. 16, 2004 | (JP) | ............................. | 2004-037891 |

(51) Int. Cl.
*B62D 21/00* (2006.01)

(52) U.S. Cl. .............. 180/312; 267/140.13; 267/141.1; 267/140.4; 180/291

(58) Field of Classification Search ........... 267/140.11, 267/140.13, 141.1, 141.2, 141.4, 141, 219, 267/293, 294, 153, 141.12, 140.3, 140.4; 180/312, 291, 300, 297; 248/562, 560
See application file for complete search history.

(56) References Cited

U.S. PATENT DOCUMENTS 4,240,517 A * 12/1980 Harlow et al. .............. 180/295

(Continued)

FOREIGN PATENT DOCUMENTS

DE    2308079    8/1974

(Continued)

OTHER PUBLICATIONS

European Search Report dated May 31, 2005.

*Primary Examiner*—James McClellan
*Assistant Examiner*—Mariano Sy
(74) *Attorney, Agent, or Firm*—Nixon Peabody LLP; Donald R. Studebaker

(57) ABSTRACT

An oscillation limiting mechanism (4) is integrally provided to an engine mount (3) (a vibration proof mount device) of a power plant (P) mounted on an automobile in a traverse mount fashion. Not only is a stopper metal member (40) in the shape of an inverted U letter disposed so as to cross over a mount body portion (30), but a stopper rubber (42) is formed so that it protrudes from the rear end of a casing of the mount body portion (30) toward the rear side of the vehicle body. Not only is a hollow portion (43) formed in the interior of the stopper rubber (42), but a metal core body (44) is also embedded in the stopper rubber (42) so as to be revolvable around an axis in the vehicle body traverse direction as if it were a link. With such a construction adopted, the stopper rubber (42) is shear-deformed in the vertical direction with comparative ease even in a state where it is brought into contact with the rear side leg portion (40c) of a stopper metal member (40) and thereby receives a compressive force in the vehicle body longitudinal direction, and a dynamic spring constant of the mount (3) in the vertical direction does not rise so much even if the stopper acts in rapid acceleration or the like; therefore, enabling increase in surrounding sound in acceleration to be suppressed with a simple structure less of cost up while oscillation of the power plant (P) is limited in a similar way to that of a torque rod.

2 Claims, 19 Drawing Sheets

U.S. PATENT DOCUMENTS

| | | | |
|---|---|---|---|
| 4,667,764 A * | 5/1987 | Sawada et al. | 180/297 |
| 5,967,251 A * | 10/1999 | Turl et al. | 180/297 |
| 6,257,562 B1 * | 7/2001 | Takashima et al. | 267/141.1 |
| 6,641,119 B1 * | 11/2003 | Kato | 267/140.12 |

FOREIGN PATENT DOCUMENTS

| | | | | |
|---|---|---|---|---|
| DE | 3712656 A1 * | 11/1987 | | |
| DE | 3936720 A1 * | 5/1990 | | 267/140.13 |
| DE | 42 09 613 A1 | 3/1992 | | |
| EP | 1 236 927 | 9/2002 | | |
| EP | 1 336 771 | 8/2003 | | |
| FR | 2 736 008 A1 | 6/1995 | | |
| JP | 60-2541 | 1/1985 | | |
| JP | 61-92329 | 5/1986 | | |
| JP | 61-228140 | 10/1986 | | |
| JP | 63-266242 A * | 11/1988 | | 267/140.13 |
| JP | 2002-257182 | 9/2002 | | |
| JP | 2003-184939 | 7/2003 | | |

* cited by examiner

VIBRATIONS IN VERTICAL DIRECTION

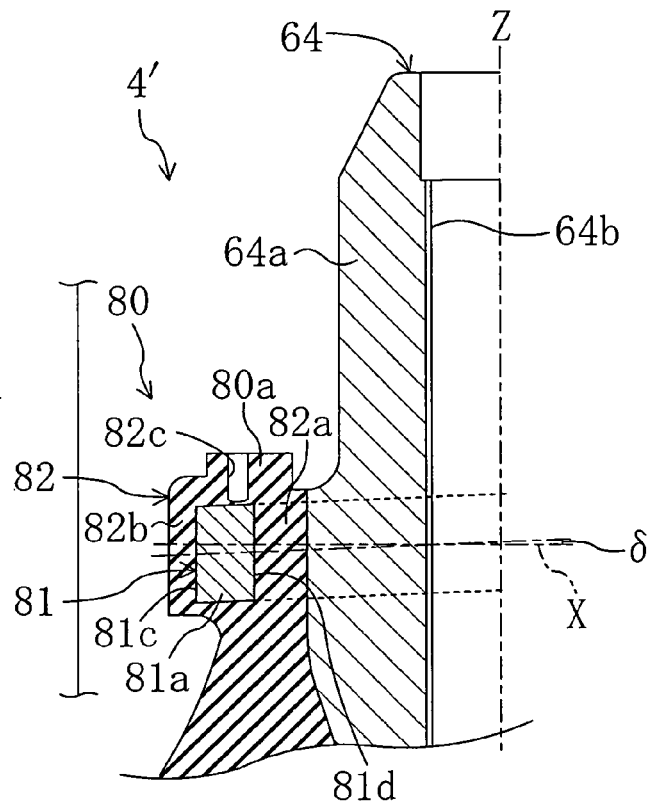
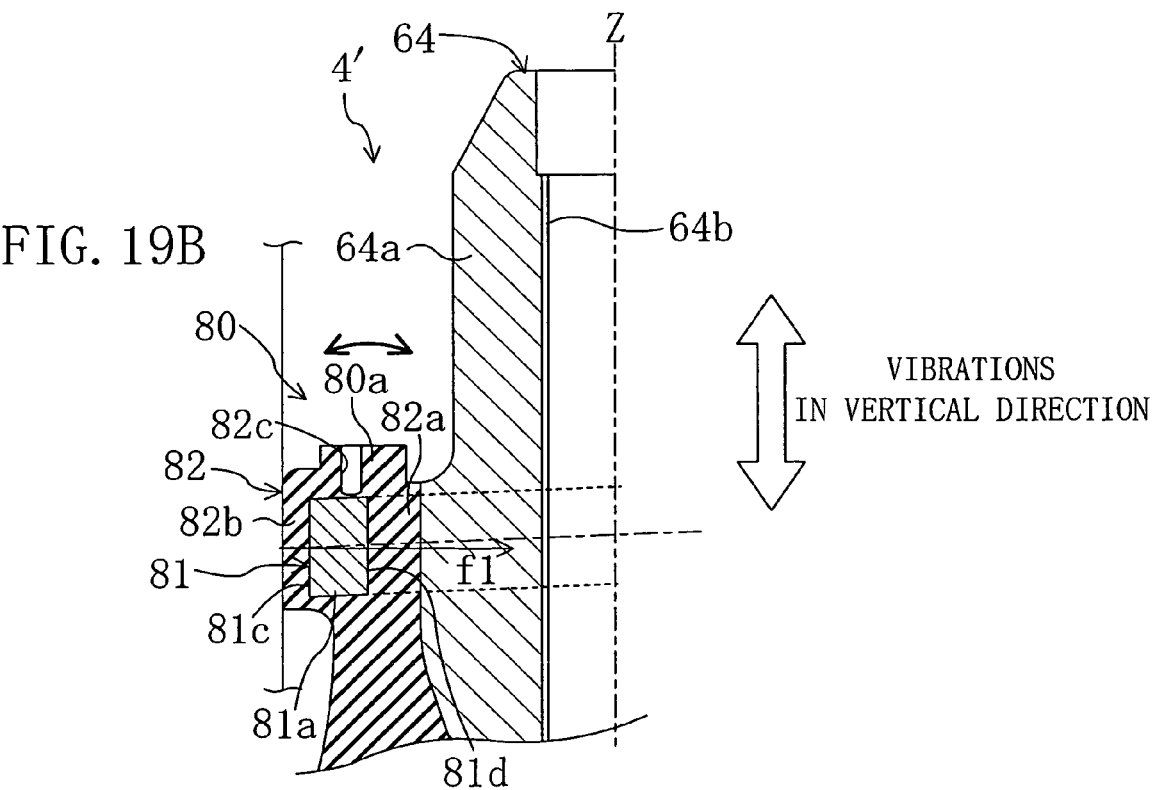

VIBRATION ISOLATING MOUNT DEVICE

BACKGROUND OF THE INVENTION

The present invention relates to a vibration isolating mount device for mounting a power plant on an automobile, and particularly, belongs to the technical field of a structure thereof in a case where a mechanism for limiting oscillation in a rolling direction of the power plant is installed integrally in a single body.

In a front engine-front drive (FF) type vehicle, for example, generally a power plant has been conventionally mounted on the vehicle body with the length direction (a direction along which a crankshaft extends) thereof aligned in the width direction of the vehicle body so that both end portions thereof are elastically supported by the body side frames located on both sides, left and right, of the engine room (a so-called traverse mount type).

As such a traverse mount type, main stream thereof is an inertia main axis mount scheme (or a torque roll axis scheme) in which main mounts on both ends, left and right, of the power plant are disposed in the proximity of a roll inertial main axis (hereinafter referred to simply as a roll axis) thereof, which is disclosed, for example, in Patent literature 1 (FP No. 2736008 A). This is because a dynamic spring performance around the roll axis is made comparatively softer with a secured support stiffness of two mounts on the left and right sides, respectively, supporting almost all the static load of the power plant, thereby enabling idle vibrations to be effectively reduced.

With the dynamic spring performance around the roll axis softer to such an extent, for example, when a driving output (torque) of the engine greatly alters as in rapid acceleration or rapid deceleration in the case of the torque roll axis mount, the power plant in the entirety greatly rolls around the roll axis by the reaction force (torque); therefore, plural mounts for limiting the rolling are usually provided before and after the power plant in addition to the main mounts on the left and right sides.

In this connection, another mount scheme is disclosed, for example, in Patent literature 2 (DP No. 4209613 A) in which supporting points for a power plant of main mounts on the left and right sides not only are set more higher than a roll axis to thereby oscillatably support the power plant in the entirety but also dispose a torque rod for limiting the oscillation at the lower end portion thereof so as to connect the power plant to the vehicle body side (this scheme is hereinafter referred to as a pendulum mount scheme).

Since in the pendulum mount scheme, main mounts on the left and right sides are farther away from a roll axis than in the general torque axis mount scheme, a force in the vehicle body longitudinal direction acts directly on the main mounts in company with rolling of the power plant; in other words, the rolling is limited by the mounts themselves. In consideration of this, according to the mount scheme described in Patent literature 2, torque rods are provided to the main mounts on the left and right mounts, respectively, in addition to an independent torque rod attached at the lower end of the power plant, thereby causing a force in the vehicle body longitudinal direction to be received.

In a case where torque rods are provided to the main mounts in such a way as well, however, the number of parts constituting the mounts increases correspondingly to thereby raise the number of assembly man-days; therefore, leading to a problem to cause a lot of cost up. This is because both ends in the front and rear sides of each of the torque rods are supported so as to be revolvable around respective horizontal axes so that a vertical motion of the corresponding mount is not hindered by attachment of the torque rod and the torque rod is connected to the corresponding mount with a rubber bush so that vibration is not transmitted to the mount.

In connection with this aspect, there has been known various kinds of stopper mechanisms capable limiting displacement in a mount with a simpler structure. In a mount scheme described, for example, in Patent literatures 3 and 4 (JP No. 2003-184939 A and JP No. 2002-257182 A), stopper rubber portions are provided so as to protrude on both sides before and after a member connected to the power plant side and the stopper rubber portions are brought into contact with members of the vehicle body side which the stopper rubber portions face in the vehicle body longitudinal direction, thereby preventing displacement beyond the members of the vehicle body side.

Since, if the stopper rubber portions are, in such a way, brought into contact with the vehicle body, an adverse possibility arises that vibrations of the power plant are transmitted to the vehicle body side through the stopper rubber portion, stopper mechanisms described in Patent literatures 5 and 6 (JP No. 61-92329 A and JP No. 60-02541 B) each are equipped with the stopper rubber portion having protruded stripes at the distal end thereof or the stopper rubber portion having a hollow in the interior thereof, thereby reducing a stiffness thereof partly. With partial reduction in the stiffness, no increase in spring constant of the mount occurs suddenly at the same time as the action of the stopper (S1), for example, as shown with a solid line (I) of FIG. 7A and increase in spring constant at an initial stage of the action of a spring occurs in a relatively mild manner, thereby enabling vibrations to be absorbed, as shown with a broken line (II) in the same figure.

The conventional stopper mechanisms (disclosed in Patent literatures 3 to 6 and the like) each, however, have no function that an increase in dynamic spring constant in the vertical direction can be restricted to the lowest level without hindering upward and downward motions of a mount by receiving and absorbing a force in the vehicle body longitudinal direction acting on the mount as a torque rod acts, so the mechanisms each cannot be a substitute for the torque rod.

That is, in the stopper mechanisms of Patent literatures 3 and 4, as described above, since elastic deformation of compressed rubber is greatly limited not only in the vehicle body longitudinal direction but also in the vertical direction in a state where the stopper rubber portion is in contact with a member of the vehicle body to receive a pushing force in the vehicle body longitudinal direction, the member of the vehicle body is restricted in motion thereof by the rubber stopper portion relative to the member of the power plant. For this reason, dynamic spring constants of the mount in the entirety in the longitudinal direction and vertical direction of the vehicle body increase suddenly at the same time as the action of the stopper, thereby degrading vibration isolating performance (see the solid lines shown in the graphs of FIGS. 7A and 7B).

In acceleration of an automobile, for example, a power plant in the entirety, in some case, has great vibrations in the vertical direction because of unbalance in reciprocating inertia force or the like of the engine, when the power plant is inclined by a driving reaction force to thereby cause a stopper to act and to degrade vibration isolating performance of mounts suddenly, which leads to an inconvenience that vibrations in the vertical direction accompanying the acceleration operation propagates into the vehicle compartment to generate a loud surrounding sound confined therein.

Even if stiffness of the stopper rubber portion is partly reduced to cope with such an inconvenience to thereby cause rubber to be elastically deformed with comparative ease at the initial stage in the action of a stopper, as shown in Patent literature 5 and 6 described above (see the broken line in the graph of FIG. 7A), such a feature works only so as to slow down degradation of vibration isolating performance of a mount in company with action of the stopper, and does not work such that increase in dynamic spring constant in the vertical direction of the mount as a whole is suppressed to thereby enable vibrations in the vertical direction to be sufficiently absorbed while a load in the vehicle body longitudinal direction is received with certainty, as a torque rod works.

SUMMARY OF THE INVENTION

The present invention has been made in light of such problematic points and it is an object of the present invention to provide a vibration isolating mount device for an engine (or a power plant) in a traverse mount fashion in a so-called FF automobile or the like in which an oscillation limiting mechanism provided therein integrally provided in a single piece is deliberately contrived in construction so as to achieve a function similar to that of a torque rod while a simple structure thereof less of cost up is realized.

In means adopted by the present invention for the purpose to achieve the object, a basic structure of a conventional known stopper mechanism is employed and, for example, a core body of a receiving member for a force in the vehicle body longitudinal direction such as a stopper rubber or the like is caused to revolve as if it were a link to thereby cause the receiving member for a force in the vehicle body longitudinal direction to be subjected to shear deformation in the vertical direction with comparative ease even when the receiving member receives a compressive force in the vehicle body longitudinal direction, thereby enabling a member of a vehicle body and a member of a power plant to displace relatively to each other in the vertical direction with comparative ease.

To be more concrete, a first invention of the present application is directed to a vibration isolating mount device not only for elastically supporting one of left and right end portions of a power plant mounted on a vehicle with the length direction of the power plant aligned in the traverse direction of the body of the vehicle, but also having an oscillation limiting mechanism for limiting oscillation of the power plant in a roll direction thereof. The oscillation limiting mechanism has a receiving member for a force in the vehicle body longitudinal direction receiving at least a compressive force in the vehicle body longitudinal direction between a member of the vehicle body and a member of the power plant facing each other in the vehicle body longitudinal direction, and the receiving member for a force in the vehicle body longitudinal direction (hereinafter referred to simply as the receiving member) is constructed of: a rubber portion and a core body made of a material higher in stiffness than the rubber portion and provided integrally with the rubber portion in a single piece at least so as to be revolvable around an axis in the vehicle body traverse direction by a predetermined angle or more.

With the mechanism adopted, the power plant revolves (rolling) around the roll axis by the action of a driving reaction force, for example, in acceleration and deceleration of an automobile to thereby cause the receiving members between the members of the power plant and the vehicle body to receive a force in the vehicle body longitudinal direction when the member of the vehicle body and the member of the power plant are displaced relatively from each other in the vibration limiting mount device, thereby enabling oscillation of the power plant to be limited.

In this situation, a rubber portion of the receiving member is compressed in the vehicle body longitudinal direction and thereby caused to be in a state of difficulty in elastic deformation, while the core body provided integrally in the receiving member as a single piece revolves as if it were a link (which is also hereinafter referred to as a link action), thereby shear-deforming the receiving member as a whole in the vertical direction with comparative ease. With such construction, since the members of the vehicle body and the power plant can be displaced relatively from each other, absorption of vibrations in the vertical direction is performed sufficiently.

That is, according to an oscillation limiting mechanism of the invention of the present application, even with a simple structure similar to that of a conventional general stopper mechanism, a function similar to that of a torque rod is achieved by a link action of a core body provided integrally with a rubber portion, which is different in function from the conventional general mechanism, thereby enabling absorption performance of vibrations in the vertical direction in a vibration isolating mount to be sufficiently maintained while oscillation of the power plant is limited effectively.

Note that to provide the core body in the receiving member so as to be revolvable by a predetermined angle or more is to construct a structure in which the core body is intentionally revolved, which is different from a structure in which a core metal or the like is embedded in a conventional known stopper rubber for reinforcement. Therefore, the core body in the receiving member can usually revolve relatively to at least one of a member of a vehicle body and a member of a power plant by a predetermined angle (for example about 1 degree) or more, for example when the receiving member receives a force in the vertical direction without the action of a force in the vehicle body longitudinal direction.

In the first invention, a hollow portion is preferably formed in the rubber portion of the receiving member at least so that the core body can be revolved around an axis in the vehicle body traverse direction (a second invention).

For example, it is recommended that the hollow portion of the receiving member is formed so as to communicate with outside the rubber portion and at least one of inner walls in the front and rear portions of the rubber portion enclosing the hollow portion is caused to swell relatively into the hollow portion on one of the upper and lower sides thereof and to thereby at least embed the core body in the swell portion (a third invention). It is preferable that the hollow portion is formed so as to pass through the rubber portion in the vertical direction and the swell portion is formed at a site relatively in the lower side in the hollow portion (a fourth invention).

With such a construction, when the receiving member receives a compressive force between the members of the vehicle body and of the power plant and the hollow portion thereof is collapsed by elastic deformation of rubber, part of the hollow portion remains uncollapsed on one of the upper and lower sides of the swell portion where the core body is embedded; therefore, the core body can be revolved in the vertical direction with comparative ease even in a state where the rubber is compressed, thereby ensuring the action and effect of the first invention to be more certain.

Alternatively, in the first invention, the core body in the receiving member may be in the shape of a rectangle the length of which in the vehicle body longitudinal direction is more than the length in the vehicle vertical direction as viewed in the traverse direction of the vehicle body (a fifth invention).

With a shape of the core body having a dimension comparatively longer in the vehicle body longitudinal direction, the core body can perform a link action without forming the hollow portion in the rubber portion, thereby enabling almost the same action and effect as those of the second invention.

Moreover, in the first invention, the core body in the receiving member is preferably provided so as to be revolved by receiving a compressive force acting between a member of the vehicle body and a member of the power plant (a sixth invention).

With the construction, when the receiving member receives a compressive force between the member of the vehicle body and the member of the power plant, the receiving member as a whole is urged to receive shear deformation in the vertical direction by revolution of the core body; therefore, displacement in the vertical direction of the members of the vehicle body and the power plant is facilitated with more of ease, leading to more of certainty of the action and effect of the first invention.

In the receiving member, for example, it is preferable that the rubber portion includes: a connecting portion connecting the core body to one of the member of the vehicle body and the member of the power plant; and a protruded end portion directed to the other member thereof from the core body, wherein the connecting portion and protruded end portion are vertically shifted in an offset arrangement (a seventh invention).

With such a construction, by bringing the protruded end portion (the rubber portion) of the receiving member provided on one of the member of the vehicle body and the member of the power plant into contact with the other member thereof to push the protruded end portion in the vehicle body longitudinal direction, the pushing force from the other member thereof and the reaction force from the one member thereof constitute a couple of forces to thereby generate a revolving force (a moment) on the core body.

Note that the term, offset, means off centering in general and for example, means that the connecting portion and the protruded end portion of the rubber portion are vertically shifted in center from each other, that horizontal lines having centers of gravity of both thereon, respectively, are vertically shifted from each other, that application points of forces acting thereon in the vehicle body longitudinal direction is vertically shifted from each other or the like.

A construction is allowed in which the core body in the receiving member assumes a crank-like shape as viewed in the vehicle body traverse direction and the front end portion and the rear end portion are vertically shifted in an offset arrangement (an eighth invention) or in which the core body is inclined so that the front end portion and rear end portion are vertically offset in position (a ninth invention).

With such constructions, when the receiving member between the member of the vehicle body and the member of the power plant is pushed from before and after, a couple of forces acts thereon in a similar manner to that in the seventh invention to revolve the core body. In order to obtain such an action with more of certainty, it is allowed to form a hollow portion at a proper site in the rubber portion.

An example is presented here as a preferable concrete structure of a vibration isolating mount device related to one of the second to ninth inventions, in which a member of the vehicle body in the shape of an inverted U letter is disposed so as to cross over the body of the mount on which a static load of the power plant is imposed to fix the lower ends of leg portions of a pair located before and after the member of the vehicle body to a side frame of the vehicle body at positions before and after, respectively, the body of the mount. The receiving member is disposed at at least one of the front and rear sites of an outer wall portion of the body of the mount, which is the member of the power plant, so as to protrude toward a leg portion of the member of the body of the vehicle which the receiving member faces in the vehicle body longitudinal direction (a tenth invention).

With the construction, not only is the member of the vehicle body in the shape of an inverted U letter provided so as to cross over the body of the mount connected to the power plant, but the receiving member is also disposed on the outer wall portion of the body of the mount, and in a case where the receiving member is provided at one of the front and rear sides or both sides of the body of the mount as well, the receiving member or members can be integrally molded in a single piece with the body of the mount in a similar manner to that in a conventional known stopper rubber, resulting in reduction in cost.

In another concrete construction of the first invention, it is preferable that members of the vehicle body are provided before and after members of the power plant so as to face each other and a rubber portion of the receiving member is provided on one of the member of the power plant and the corresponding member of the vehicle body. The core body of the receiving member not only is inclined by a predetermined angle relative to a horizontal plane in the vehicle body longitudinal direction, but is also disposed so as to surround the member of the power plant across more than a half of the circumference from one of the left and right sides so as to receive a compressive force in the vehicle body longitudinal direction between the member of the power plant and the corresponding one of the members in the front and rear sides of the vehicle body (an eleventh invention).

With such a construction, since the core body in the receiving member is inclined relative to a horizontal plane even when the receiving member for a force in the vehicle body longitudinal direction receives a compressive force acting between the member of the vehicle body and the member of the power plant in acceleration and deceleration of an automobile, the core body revolves as if it were a link without being restricted strongly by the compressive force, thereby facilitate the receiving member as a whole to be subjected to shear deformation vertically with comparative ease. With such shear deformation with comparative ease, the action and effect of the first invention can be obtained with more of certainty.

In addition, in the acceleration and deceleration, a compressive force occurring between the member of the power plant and the corresponding one of the members of the vehicle body can be received by one receiving member; therefore enabling a structure having a function similar to that of a torque rod forward or backward in the vehicle body longitudinal direction to be realized at a low cost.

In the eleventh invention, it is preferable that the rubber portion of the receiving member is provided to the member of the power plant and a flat plane portion in almost parallel to a surface of the member of the vehicle body which the flat plane faces is formed at at least one end portion of the front and rear sites of the core body (a twelfth invention).

With such a construction, when one end portion of the front and rear sites of the receiving member for a force in the vehicle body longitudinal direction is brought into contact with the member of the vehicle member by displacement of the member of the power plant in the vehicle body longitudinal direction, the core body of the receiving member receives a pushing force uniformly over the entire surface of the flat plane portion, preventing damage or the like in the rubber portion sandwiched therebetween.

It is more preferably that the rubber portion of the receiving member is provided to the member of the power plant and a surface with a circular arc in section swelled in the middle of the vertical width is formed at at least one end portion of the front and rear sites of the core body (a thirteenth invention).

With such a construction, the link action of the core body can be more easily realized as compared with the case where the one end surface of the core body is of a flat plane.

In order to obtain a core body in the receiving member in a predetermined inclined state, the rubber portion is necessary to be cured in a state where the core body is held obliquely relative to a horizontal direction, wherein the receiving member is supported by pin members so that the core body obtains an inclined state of being held at a predetermined angle relative to a horizontal plane in the vehicle body longitudinal direction and then integrated with the rubber portion in a single piece.

Accordingly, in a case where the core body is embedded in the rubber portion at least at both of the front and rear sites of the member of the plant power, and holes (in which the pin members are inserted in cure molding of the rubber portion) are formed that extend in the vertical direction down or up to a surface of the core body in the rubber portion from the upper or lower surface of the rubber portion at sites thereof corresponding to sites on the front and rear portions of the core body so that height positions of the bottoms of the holes on the front and rear portions of the core body are different from each other (a fourteenth invention).

As described above, according to a vibration isolating mount device related to the invention of the present application, in a case where an oscillation limiting device is provided instead of a torque rod as functional replacement in the vibration isolating mount of a power plant mounted in a traverse mount fashion in an engine room of an automobile, a basic structure of a conventional known stopper mechanism is employed: for example with a core body in a receiving member for a force in the vehicle body longitudinal direction such as a stopper rubber so as to revolve around an axis in the vehicle traverse direction as if it were a link provided, the receiving member for a force in the vehicle body longitudinal direction is shear-deformed in the vertically direction with comparative ease when the receiving member receives a compressive force in the vehicle body longitudinal direction; therefore, not only can a load in the vehicle body longitudinal direction be received and absorbed with certainty as a torque rod does, though with a simple structure less in cost up, but also no dynamic spring constant suddenly increase in the vertical direction and the surrounding sound due to acceleration of automobile can be sufficiently suppressed.

BRIEF DESCRIPTION OF THE DRAWINGS

FIGS. 19A and 19B are views related to the embodiment 3 corresponding to FIGS. 6A and 6B.

DETAILED DESCRIPTION OF THE INVENTION

Detailed description will be given of embodiments of the present invention below with reference to the accompanying drawings. Note that it should be understood that description of the following preferable embodiments are presented in essence only by way of illustration and is not intended to restrict the present invention, products to which the present invention is applied or applications of the present invention.

Embodiment 1

Figure 1:
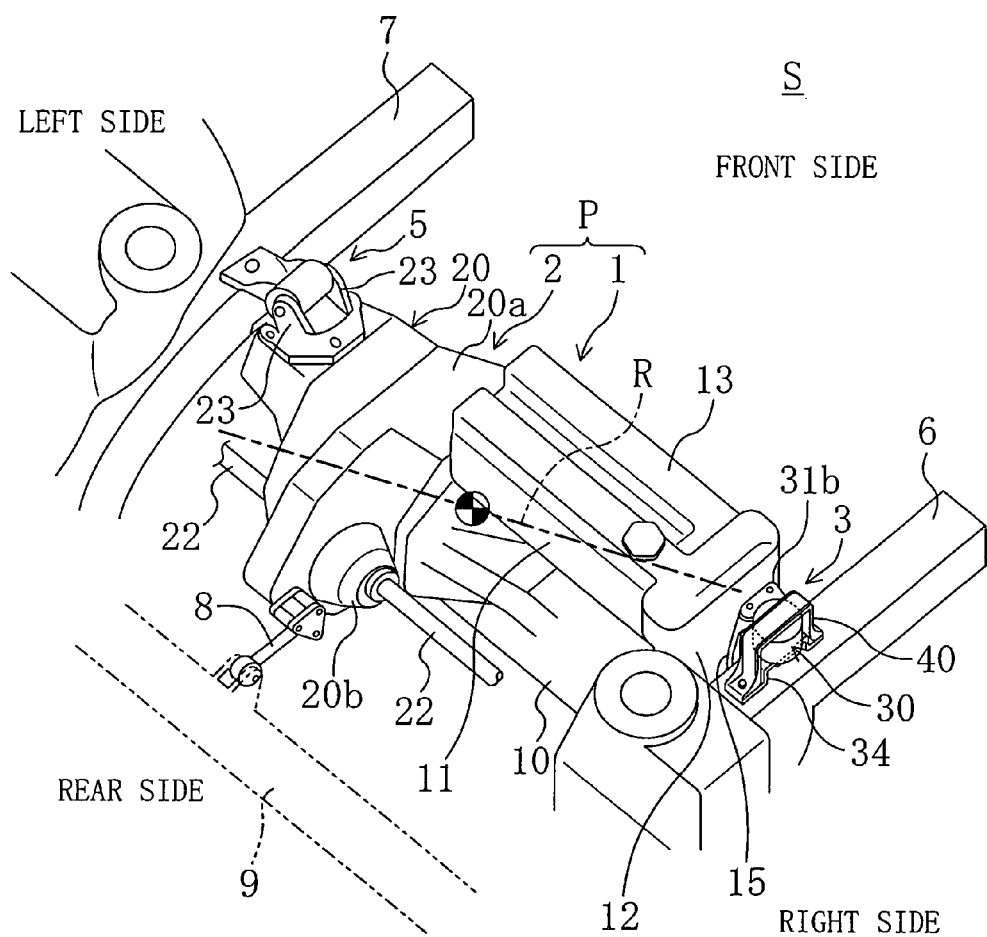
FIG. 1 is a perspective view showing a schematic construction of an engine mount system.
Figure 2:
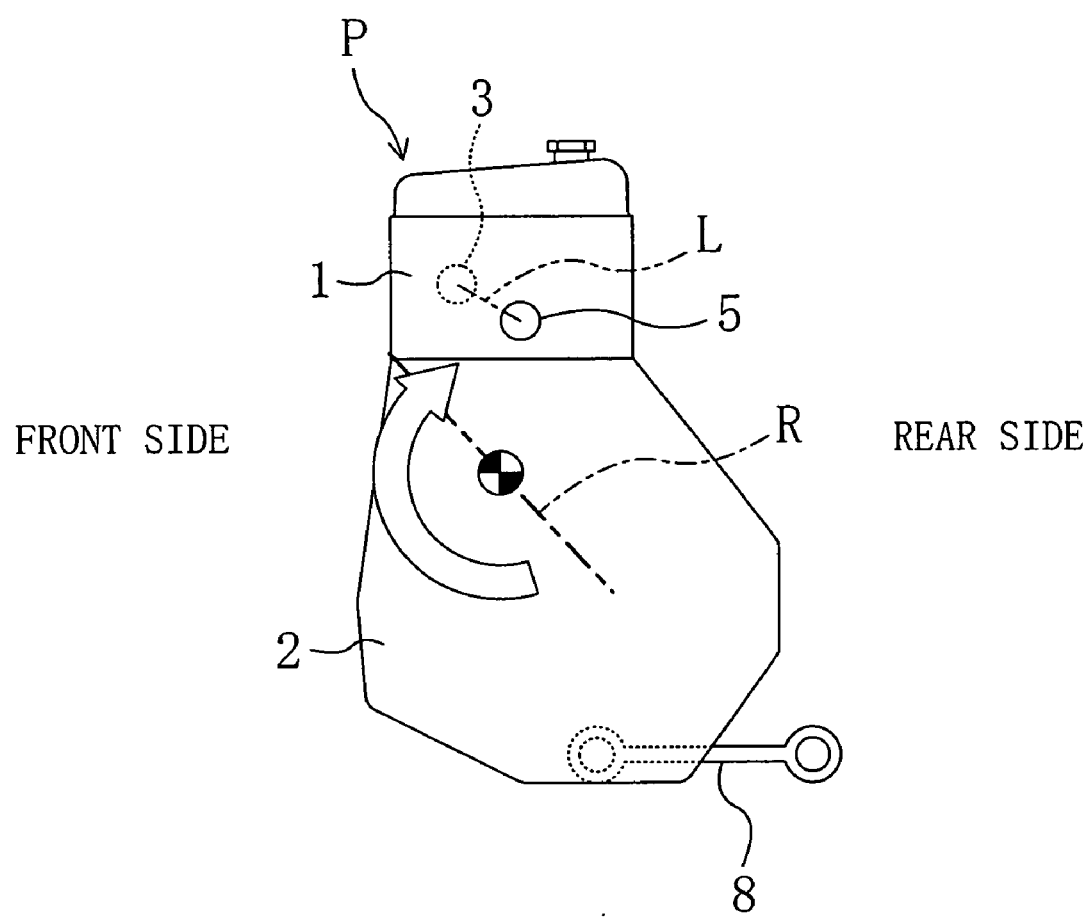
FIG. 2 is a descriptive view as a model of a power plant showing a way that a driving reaction force (torque) acts as viewed from the left side of the body of a vehicle.

FIGS. 1 and 2 show a schematic construction of an engine mount system using a vibration isolating mount device related to the embodiment 1 of the present invention. In both figures, a mark P is a power plant constructed by coupling in series an engine 1 and a transmission 2 to each other. The power plant P is mounted in an engine room of an automobile not shown in a traverse mount fashion so that the length direction thereof (a direction in which a crankshaft of the engine 1 extends) takes a vehicle width direction (a vehicle body traverse direction) and elastically supported by vehicle body side frames 6 and 7 at two sites thereof through mounts 3 and 5 disposed at both end portions in the length direction, that is at end portions on the side of the engine 1 thereof and the side of the transmission 2 thereof. The lower end portion of the power plant P is connected to a vehicle body side member 9 (a subframe or the like) in the rear side of the vehicle body by a torque rod 8 independent of the mounts 3 and 5.

FIG. 1 shows an outer appearance only of the body of the power plant as viewed obliquely from the upper right position at the rear side of the vehicle body omitting all of an intake-exhaust system, auxiliary equipment thereof and the others of the engine 1 and the body of the engine 1 roughly includes: a cylinder block 10 and a cylinder head 11 arranged thereon and in addition, is provided with a belt cover 12 at an end portion in the length direction opposite the transmission 2 (the right end portion of the vehicle body shown in Fig. 1 at the front thereof) and further not only a head cover 13 on the top of the cylinder head 11 but also an oil pan (not shown) in the lower portion of the cylinder block 10. The lower end side of an engine side mount bracket 15 is fastened to the right side wall of the cylinder head 11 passing through the belt cover 12 and a flange plate 31b extending from the mount 3 side is fastened, in a state of being superimposed from above, onto the upper end portion of the mount bracket 15 extending upward from the lower end thereof. The engine side mount 3 is a vibration isolating mount device of the present invention and description will be given of details of the construction later.

The transmission 2 in this embodiment is an automatic transmission (which, instead, may be a manual transmission, CVT or the like) constructed from a torque converter, a transmission gear train and in addition thereto a differential gear integrated in a single piece and not only is a bell housing 20a of the transmission case 20 is connected to the cylinder block 10 at a crankshaft side end portion of the engine 1, but driveshafts 22 and 22 for driving the front wheels of an automobile also extend from a swell portion 20b formed on the rear side of the bell housing 20a toward both sides in the vehicle traverse direction. The transmission side mount 5 is disposed in a manner such that the transmission case 20, at a position in the vicinity of the distal end toward which the transmission case 20 is tapered, is hung down from the side frame 7 in the left side of the vehicle body by a mount bracket 23.

In the power plant P constructed by coupling in series the engine 1 and the transmission 2, since the engine 1 is higher than the transmission 2, a roll axis R (a roll inertia main axis) extending the length direction is inclined downward in a direction from an end portion of the engine 1 side to the transmission 2 side as shown with an alternate long and short line in the figure. In this embodiment, the two mounts 3 and 5 sharing a weight of the power plant P therebetween is spaced upward from the roll axis R, whereby the power plant P can oscillate like a pendulum around a line segment L (an oscillation support axis: see FIG. 2) connecting between load support points of the two mounts 3 and 5.

When a large driving reaction force (a torque) acts, for example, as in rapid acceleration or rapid deceleration of an automobile, the power plant P tends to oscillate forward and rearward like a pendulum as a whole with the oscillation axis L thereabove as a center while revolving almost around the roll axis R, as shown as a model with an open arrow mark in FIG. 2, whereas such a rolling and an oscillation thereof as a whole are not only restricted mainly by the torque rod 8 disposed in the lower end of the power plant P but also restricted by the oscillation limiting mechanisms 4 (see FIGS. 3 to 5) disposed in the left and right mount 3 and 5.

That is, in this embodiment, as described above, the oscillation limiting mechanisms having a function similar to that of a torque rod are provided in the left and right mounts 3 and 5 in addition to the independent torque rod 8 disposed in the lower end portion of the power plant P, and even if the power plant P is caused to roll by a driving reaction force or the like in the acceleration to impose a large load in the vehicle body longitudinal direction on the mounts 3 and 5, the load is received and absorbed by the oscillation limiting mechanisms to thereby restrict oscillation of the power plant P with more of certainty.

Structure of Engine Side Mount

Figure 3:
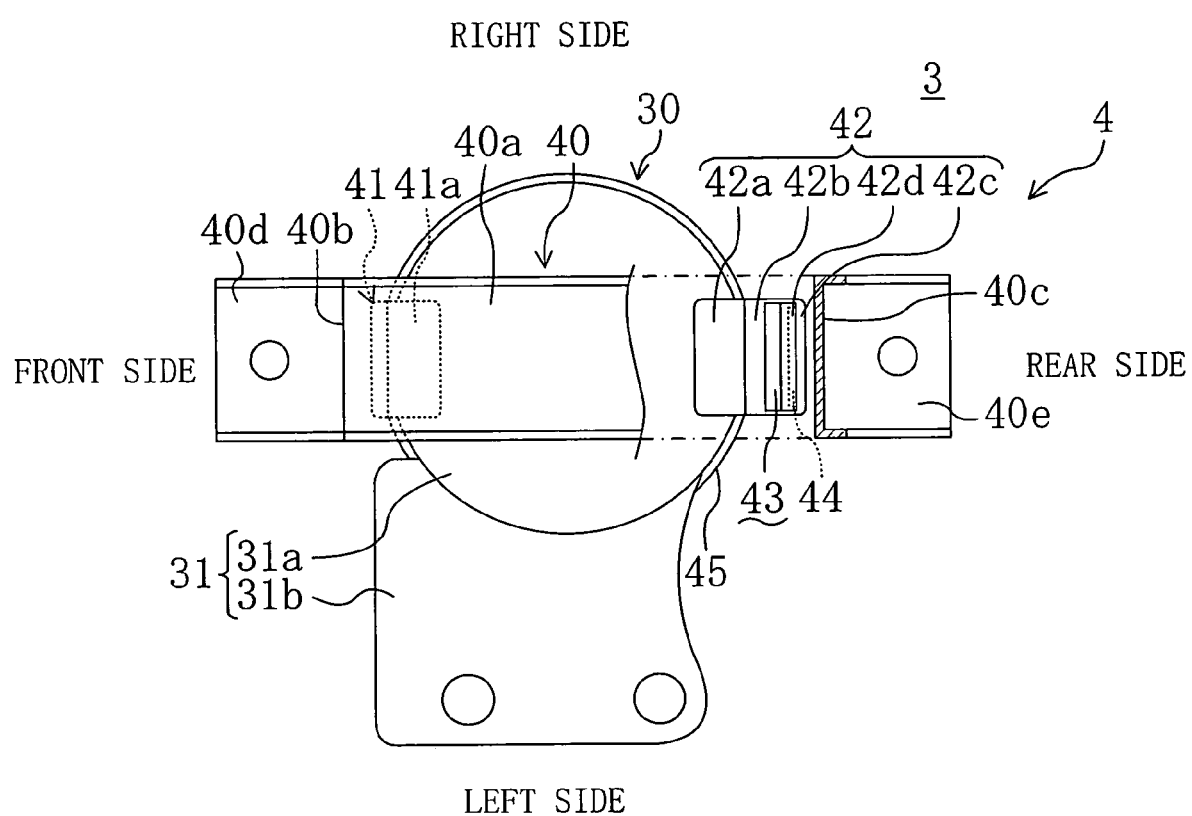
FIG. 3 is an enlarged upper surface view showing a structure of a mount on the engine side of an embodiment 1.
Figure 4:
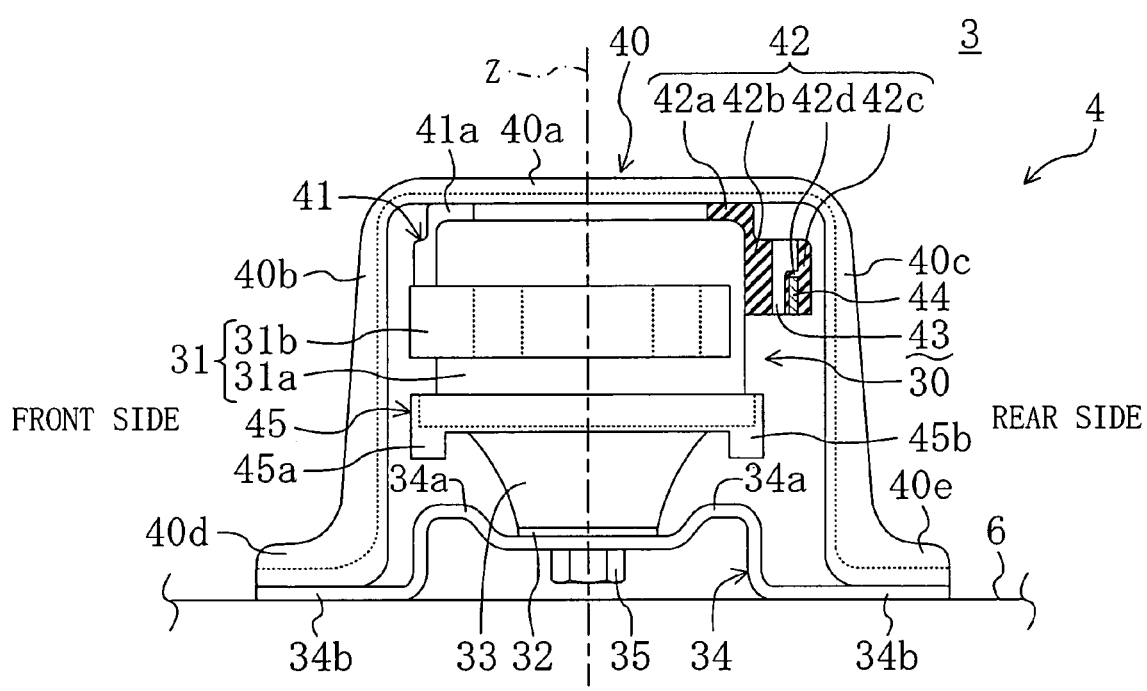
FIG. 4 is a left side view of FIG. 3.
Figure 5:
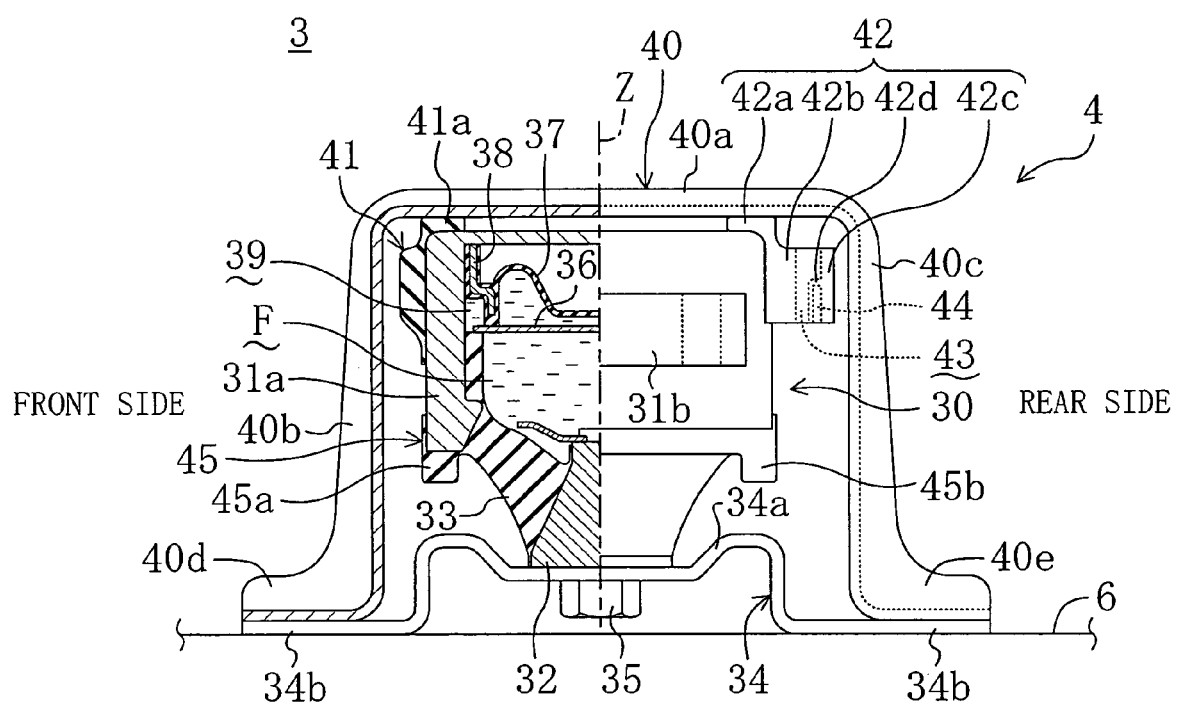
FIG. 5 is a partially sectional view showing an internal structure of the body of a mount.

Then, description will be given of details of the structure of the engine side mount 3 of the two mounts 3 and 5 on the engine side and transmission side with reference to FIGS. 3 to 5. FIG. 3, herein, is an upper surface view of the engine side mount 3 and FIG. 4 is a left side view thereof. FIG. 5 is a partially sectional view showing an internal structure of the body 30 of a mount part of which is cut away. Note that while detailed description is omitted of the transmission side mount 5, the basic structure is of a conventional known one.

In this embodiment, as shown in FIG. 5, the engine side mount 3 is a so-called liquid sealed type and the mount body 30 supporting a static load of the power plant P is constructed from a metal casing 31 (a member of the power plant side) connected to the power plant side and a connecting metal member 32 of the vehicle body side, both of which are connected by a rubber elastomer 33. The casing 31 is made of, for example, an aluminum alloy and is constructed from a casing body 31a (an outer wall portion) in the shape of a thick wall cylinder disposed so as to extend vertically and a flange plate 31b extending from the outer circumference in the upper side of the casing body 31 in a direction intersecting with an axial line Z at an almost right angle, both of which are fabricated by casting or the like in a single piece.

The connecting metal member 32 is in the shape of a near circular cone tapered at the top thereof and disposed concentrically with the casing body 31a so that the top end portion thereof is located almost at the center of the lower end opening of the casing body 31a, and the rubber elastomer 33 is interposed between the tapered side surface portion and the inner circumferential surface of the casing body 31a facing the outer circumferential surface of the connecting metal member 32. On the other hand, an upward swell portion 34a of a mount bracket 34 on the vehicle body side fixed on the upper surface of the vehicle side frame 6 is joined to the lower end surface of the connecting metal member 32 and both are fastened to each other with a bolt 35.

The rubber elastomer 33 is formed so as to have a lower inner circumferential surface in the shaped of an inverted cone recess and a circumferential surface of the recess is adhered to the tapered side surface portion of the connecting metal member 32. The rubber elastomer 33 is shaped such that it expands outward radially and obliquely upward from all of the periphery of the connecting metal member 32 to form almost the shape of a frustum of a circular cone and the outer circumferential surface thereof is adhered to the inner circumferential surface of the casing body 31a. The upper side portion of the rubber elastomer 33 fixedly adhered to the inner circumferential surface of the casing body 31a is in the shape of a cylinder having a comparatively thick wall and open upward and the top end portion thereof is located lower than the top end portion of the casing body 31a by a predetermined length.

A partition plate 36 in the shape of a disk is superimposed, from above, on the top end portion of the rubber elastomer 33 and a rubber diaphragm 37 almost in the shape of a hat is provided so as to cover the partition plate 36 from above. With such a construction, the top end opening of the rubber elastomer 33 is liquid-tightly closed to form a cavity section in the interior thereof. A reinforcing plate 38 almost in the shape of a cylinder is embedded in the outer circumferential side of the diaphragm 37 and the outer circumferential portion reinforced thereby is press inserted from above in the top end side of the casing body 31a and fixed in an internally fitting state.

A shock absorbing liquid such as ethylene glycol is sealed in the cavity portion defined as described above in the interior of the rubber elastomer 33 to form a liquid chamber F for absorbing and alleviating vibrations of the power plant P caused by a force applied to the rubber elastomer 33. The interior of the liquid chamber F is partitioned into two spaces one on the other by the partition plate 36 and the lower space serves as a pressure-receiving chamber a volume of which expands or shrinks in company with deformation of the rubber elastomer 33. The upper space of the liquid chamber F serves as an equilibrium chamber a volume of which is expanded or shrunk by deformation of the diaphragm 37 to absorb a change in volume of the pressure-receiving chamber.

That is, an annular orifice passage 39 surrounded with the casing body 31a, a flange portion and an inner cylindrical portion of the diaphragm 37 is formed so as to extend in a circumferential direction in the upper part of the outer circumferential portion of the partition plate 36 and one end of the orifice passage 39 face and is open in the pressure-receiving chamber in the lower side of the liquid chamber F, while the other end of the orifice passage 39 faces and is open in the equilibrium chamber in the upper side of the liquid chamber 38. The shock absorbing liquid in the pressure-receiving chamber and the equilibrium chamber communicate with each other through the orifice passage 39 to thereby attenuate vibrations of low frequencies acting on the pressure-receiving chamber From the rubber elastomer 33.

Oscillation Limiting Mechanism

An oscillation limiting mechanism 4 that is a feature of the invention of the present application is generally provided to the engine side mount 3 as shown in FIGS. 3 to 5 in addition to the mount body portion 30 with a structure as described above. Note that while detailed description is omitted, an oscillation limiting mechanism having a similar function is installed in the transmission side mount 5 as well.

A stopper metal member 40 (a member of the vehicle side) in the shape of an inverted U letter fabricated by press working of a steel sheet or the like is attached to the vehicle body side frame 6 so as to cross over the mount body portion 30 from the front side to the rear side thereof. The stopper metal member 40 has a beam portion 40a extending in a direction from the front side to the rear side of the member almost horizontally above the mount body portion 30 and a pair of leg portions 40b and 40c extending downward from both end portions thereof as extensions of the beam 40a. The lower end portions of the pair of leg portions 40b and 40c are further bent to form flange portions 40d and 40d, and the flange portions 40d and 40e are fastened with bolts not shown on the side frame 6 in the state of being overlapped on flange portions 34b and 34b of the vehicle body side mount bracket 34 at the front and rear sides of the mount body portion 30.

Note that in the figures, there is shown the mount body portion 30 in the state without a load imposed thereon and in this state, the upper surface of the casing 31 of the mount body portion 30 and the beam portion 40a of the stopper metal member 40 are close to each other, while in a state of 1G where the engine side mount 3 is attached to the vehicle body and a static load of the power plant P acts on the mount body portion 30, since the rubber elastomer 33 is deformed, though not shown, to displace the casing 31 downward, a predetermined clearance is formed between the upper surface of the casing 31 and the beam portion 40a of the stopper metal member 40.

On the other hand, stopper rubbers 41 and 42 are provided on the upper end portions at the front and rear ends of the outer circumferential surface of the casing body 31a so as to correspond to the leg portions 40b and 40c of the stopper metal member 40 in the front and rear side thereof. The stopper rubbers 41 and 42 on the front and rear ends of the casing body 31a are brought into contact with the respective corresponding legs 40b and 40c in the front and rear sides of the stopper metal member 40 to thereby limit movement of the casing body 31a in the vehicle body longitudinal direction, wherein especially the stopper rubber 42 on the rear side in the vehicle body longitudinal direction is provided in the interior thereof with a hollow portion 43 formed in a characteristic way described below and a core body 44 is embedded therein, thereby exerting a function equal to that of a torque rod.

Upward swell portions 41a and 42a raised upwardly on the upper surface of the casing body 31a are formed as parts of the stopper rubbers 41 and 42 on the front and rear ends of the casing body 31a and the upward swell portions 41a and 42a are brought into contact with the beam portion 40a of the stopper metal member 40 from below to thereby limit upward movement of the casing body 31a. On the other hand, an annular rubber layer 45 is formed on the outer circumferential surface of the lower end portion of the casing body 31a so as to work in cooperation with the rubber elastomer 33 and the both of the front and rear ends of the rubber layer 45 are swelled downward and the downward swell portions 45a and 45b are brought into contact with the upward swell portion 34a of the vehicle body side mount bracket 34, thereby limiting downward movement of the casing body 31a.

Figure 6A:
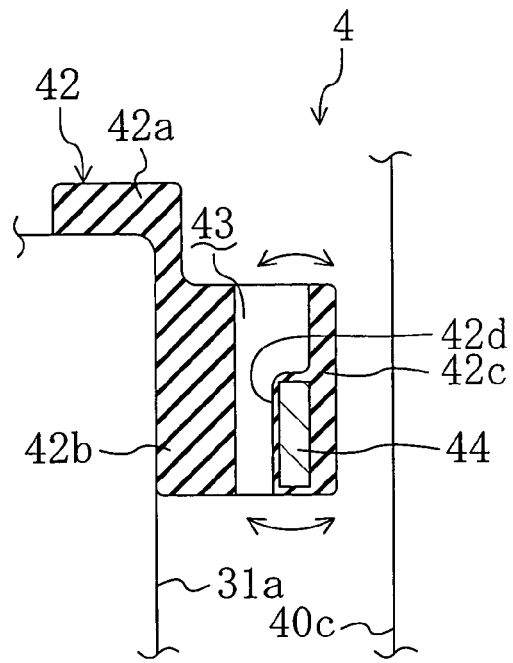
FIGS. 6A and 6B are enlarged sectional views as a model showing a structure and workings of a oscillation limiting mechanism.

Detailed description will be given of a structure of the rear side stopper rubber 42 with reference to FIGS. 6A and 6B. The rear side stopper rubber 42, as shown in FIG. 6A, has a long narrow hollow portion 43 vertically passing through the interior of a rubber block cure-adhered onto the outer circumferential surface of the easing body 31a formed in a fabrication process of the mount body portion 30, and at the same time, the metal core body 44 in the shape of a rectangular plate is disposed so as to be adjacent to the hollow portion 43, and in cooperation with each other, the rear side stopper rubber 42 can be shear-deformed with comparative ease while receiving a pushing force in the vehicle body longitudinal direction.

To be detailed, the rear side stopper rubber 42 has the shape of a rectangular block as a whole and has a rubber block portion 42b located in the front side and a rubber wall portion 42c located in the rear side with the hollow portion 43 (see FIG. 3) in the sectional shape of a rectangle as viewed in the vertical direction interposed therebetween. The inner surface (the inner wall surface surrounding the rear side of the hollow portion 43) of the rubber wall portion 42c thereof swells inward in a relative sense at a site in the lower side thereof and the core body 44 is embedded in the swell portion 42*d*. That is, the hollow portion 43 has the sectional shape with a stepped structure where lengths in the vehicle body longitudinal direction in the upper and lower sides are different from each other as viewed from in the vehicle body traverse direction as shown in FIG. 6A (a stepped hollow portion).

Figure 6B:
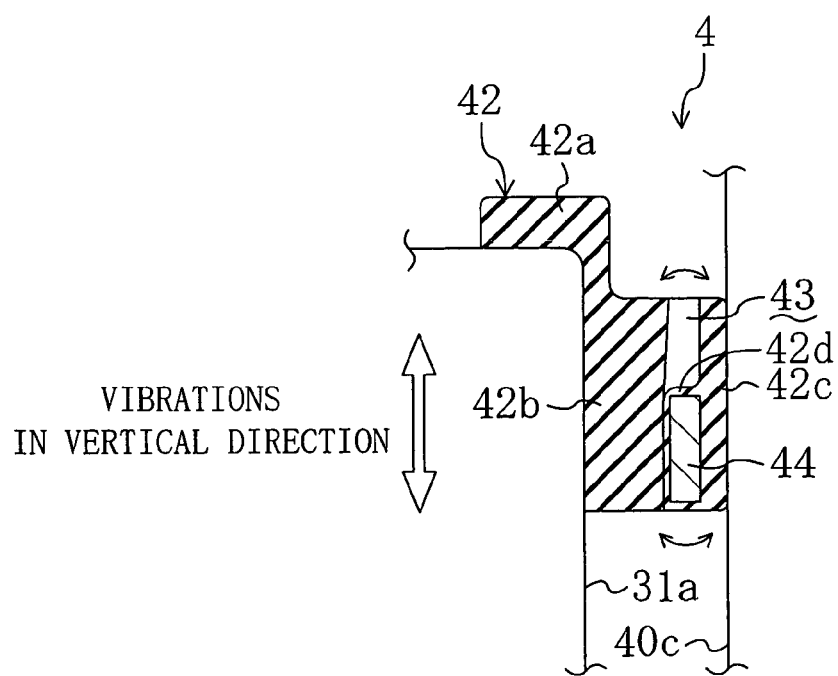

With such a construction, as shown in FIG. 6B, when the rear end surface of the rear side stopper rubber 42 is brought into contact with the rear side leg 40*c* of the stopper metal member 40 to receive a pushing force in the vehicle body longitudinal direction, the swell portion 42*d* having an area equal to or more than almost a half of the inner wall surface in the rear side of the hollow portion 43 is brought into contact with the rubber block portion 42*b* in the front side to thereby receive and absorb a force in the vehicle body longitudinal direction with certainty. In this situation, since the core body 44 with a high stiffness is embedded in the swell portion 42*d*, the upper side part of the hollow portion 43 located in the upper position remains uncollapsed to thereby elastically deform the rubber portion on a side of the upper side part of the hollow portion 43 with comparative ease.

Therefore, even if the rubber block portion 42*b* and the rubber wall portion 42*c* both compressed in the vehicle body longitudinal direction are in a state with difficulty in elastic deformation, the upper side part of the hollow portion 43 remaining uncollapsed expands or shrinks to enable the core body 44 to revolve (a link action) around an axis in the vehicle body traverse direction as a link and to thereby enable the rear side stopper rubber 42 in the entirety to shear-deform in the vertical direction with comparative ease, therefore, enabling vertical vibrations between the mount body potion 30 and the stopper metal member 40 to be sufficiently absorbed.

Note that in a state where the rear side stopper rubber 42 receives no pushing force in the vehicle body longitudinal direction as described above, the core body 44 can revolve around an axis in the vehicle body traverse direction with ease by expansion and shrinkage of the hollow portion 43 with ease: for example, by an angle of about 1 degree or more relative to the casing body 31*a*. In the construction described above, the core body 44 is embedded in the rubber swell portion 42*d*, while, without limiting to this, a construction may be adopted in which part of the core body 44 is embedded in the swell portion 42*d* and the other part thereof is embedded in the body of the rubber wall portion 42*c*.

Action and Effect

With the construction adopted, according to the vibration isolating mount device (the engine side mount 3) related to the embodiment 1, for example, when an automobile is at rest and the engine 1 is in an idling state, idling vibrations of low frequencies caused by a change in torque or the like are absorbed by the rubber elastomer 33 of the mount body 30 to thereby suppress transmission of the vibrations to the vehicle body. In this situation, for example, since, in the engine side mount 3, the stopper rubbers 41 and 42 or the like of the mount body 30 are spaced apart from the stopper metal member 40, no idling vibration is transmitted to the vehicle body therethrough.

On the other hand, when a large driving reaction force (torque) such as, for example, that in rapid acceleration of an automobile, the power plant P tends to sway as a whole like a pendulum with the oscillation support axis L thereabove as a center forward or rearward while rolling almost around the roll axis R as shown as a model with a open arrow mark in FIG. 2. On this occasion, a displacement in revolution around the roll axis R is not only restricted by the independent torque rod 8 in the lower end portion of the power plant P, but also suppressed by the oscillation limiting mechanisms in the left and right mounts 3 and 5, thereby suppressing oscillation of the power plant P effectively.

In this situation, for example, in the oscillation limiting mechanism 4 in the engine side mount 3, since the rear side stopper rubber 42 is placed in a state of being brought into contact with the stopper metal member 40 to receive a compressive force in the vehicle body longitudinal direction, there arises a risk that vibrations in vertical direction of the power plant P is transmitted to the vehicle body through the rear side stopper rubber 42, while the rear side stopper rubber 42, as described above, can be shear-deformed in the vertical direction with comparative ease even by receiving a compressive force in the vehicle body longitudinal direction since the stepped hollow portion 43 and the core body 44 in the rear side rubber stopper 42 cooperate with each other and cause a link action.

With such workings in effect, a rise in dynamic spring constant in the vertical direction of the mount 3 as a whole is quite smaller even if the stopper works and transmission of the vibrations in the vertical direction to the vehicle body is effectively suppressed even if vibrations in the vertical direction of the power plant P increase by rapid acceleration of the engine; therefore causing a surrounding sound in the vehicle compartment due to acceleration to be suppressed so as not to become especially intense.

Figure 7A:
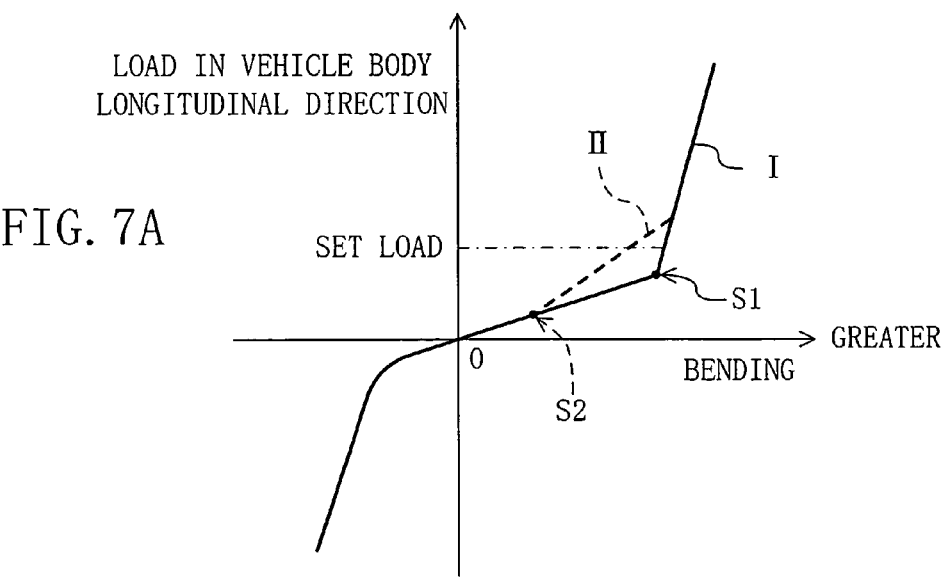
FIG. 7A is a graph for a load vs. displacement showing a change in static spring characteristic in the vehicle body longitudinal direction of a mount in company with acceleration and deceleration of an automobile
Figure 7B:
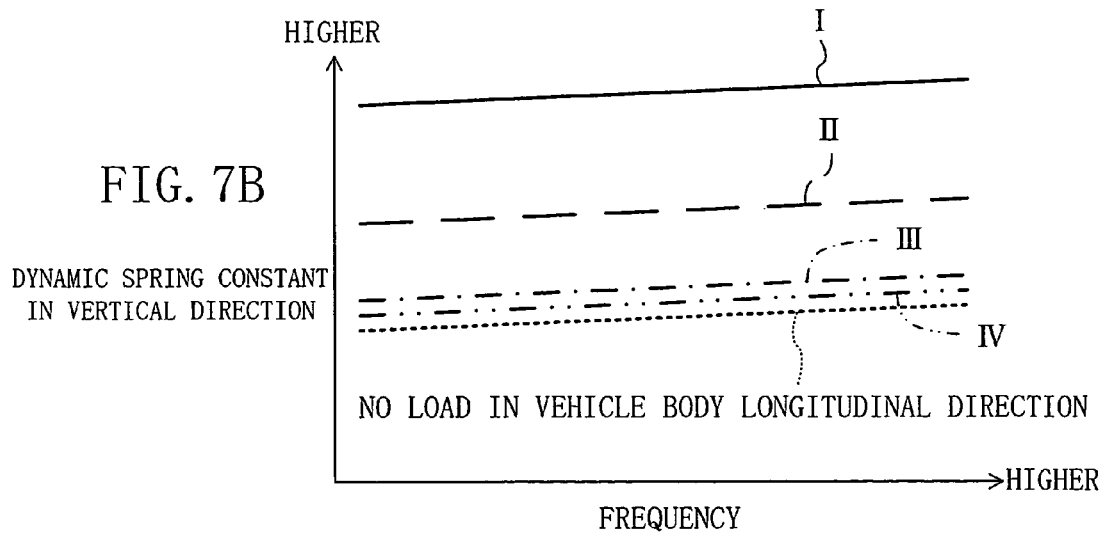
FIG. 7B is a graph showing changes in dynamic spring characteristic in the vertical direction before and after action of a stopper.

FIGS. 7A and 7B show results of investigation on a change in spring characteristic of a vibration isolating mount before and after action of the stopper in company with acceleration and deceleration of an automobile as described above, wherein FIG. 7A is a graph showing a load vs. displacement (bending) curve showing a change in a static spring constant in the vehicle body longitudinal direction and FIG. 7B is a graph showing a change in a dynamic spring constant in the vertical direction before and after the action of the stopper.

The curve shown with a solid line (I) in FIG. 7A is of a conventional general stopper made of a solid rubber, wherein it is understood that an inclination of the curve is mild and a spring is soft till the stopper acts at a low acceleration, while an inclination of the curve rises steeply when the stopper acts (a point S1 in the figure) and a stiffness of a compressed rubber increases drastically. Since a static spring constant automatically increases in the vertical direction when a static spring constant increase in the vehicle body longitudinal direction as described above, a dynamic spring constant in the vertical direction rapidly increases as shown with a solid line (I) in FIG. 7B to greatly degrade an absorption performance of vibrations in the vertical direction in a state where a set load corresponding to a predetermined acceleration state of an automobile acts as shown with an alternate long and short dash line in FIG. 7A, (shown with a dotted line is the dynamic spring constant in the vertical direction without a load acting in the vehicle body longitudinal direction).

A curve shown with a broken line (II) in FIG. 7A is of a case where a hollow portion is provided in a stopper rubber as is disclosed in each of conventional examples (Patent literatures 5 and 6) to thereby reduce a stiffness partly, wherein since a rise in a spring constant in the vehicle body longitudinal direction at an initial stage of action of the stopper (S2) is mild as compared with that of the solid rubber (I), an inclination of a curve is comparatively mild even when the set load acts and a softer spring characteristic is achieved as compared with that of a solid rubber. In this case as well, however, a dynamic spring constant in the vertical direction increases as shown with the broken line (II) in FIG. 7B corresponding to a rise in a spring constant in the vehicle body longitudinal direction of the stopper rubber; therefore, degradation in absorption performance for vibrations in the vertical direction cannot be avoided.

In contrast to this, since in a case of the stopper rubber 42 in the embodiment 1, the core body 44 performs a link action as described above to thereby enable a rise in dynamic spring constant in the vertical direction to be sufficiently suppressed while receiving and absorbing a force in the vehicle body longitudinal direction with certainty in a similar way to that of a torque rod, it is understood that a low dynamic spring constant in the vertical direction can be achieved that is close to that when no set load acts in the vehicle body longitudinal direction as shown with an alternate long and short dash line (III) in FIG. 7B even in a state where the set load acts in the vehicle body longitudinal direction acts. Note that an alternate long and two short dashes line (IV) in FIG. 7B shows a dynamic spring constant in the vertical direction in the embodiments 2 and 3 described later.

Therefore, with the oscillation limiting mechanism 4 in the vibration isolating mount device 3 related to the embodiment 1, a function similar to that of a torque rod can be obtained by a link action of the core body 44 embedded in the stopper rubber 42 while cost up is prevented in a simple structure similar to that of a conventional general stopper mechanism, whereby absorption performance for vibrations in the vertical directions by the mount 3 can be maintained while oscillation of the power plant P is effectively restricted even if the power plant P oscillates; thereby enabling increase in surrounding sound in acceleration to be prevented.

In this embodiment, not only is the stopper metal member 40 in the shape of an inverted U letter provided so as to cross over the mount body portion 30 of the vibration isolating mount 3, but the stopper rubbers 41, 42 and 45 in the vehicle body longitudinal and vertical directions are also integrally with the casing 31 of the mount body portion 30 in a single piece, and thereby as well reduction in cost can be realized.

Example Modification

Figure 8:
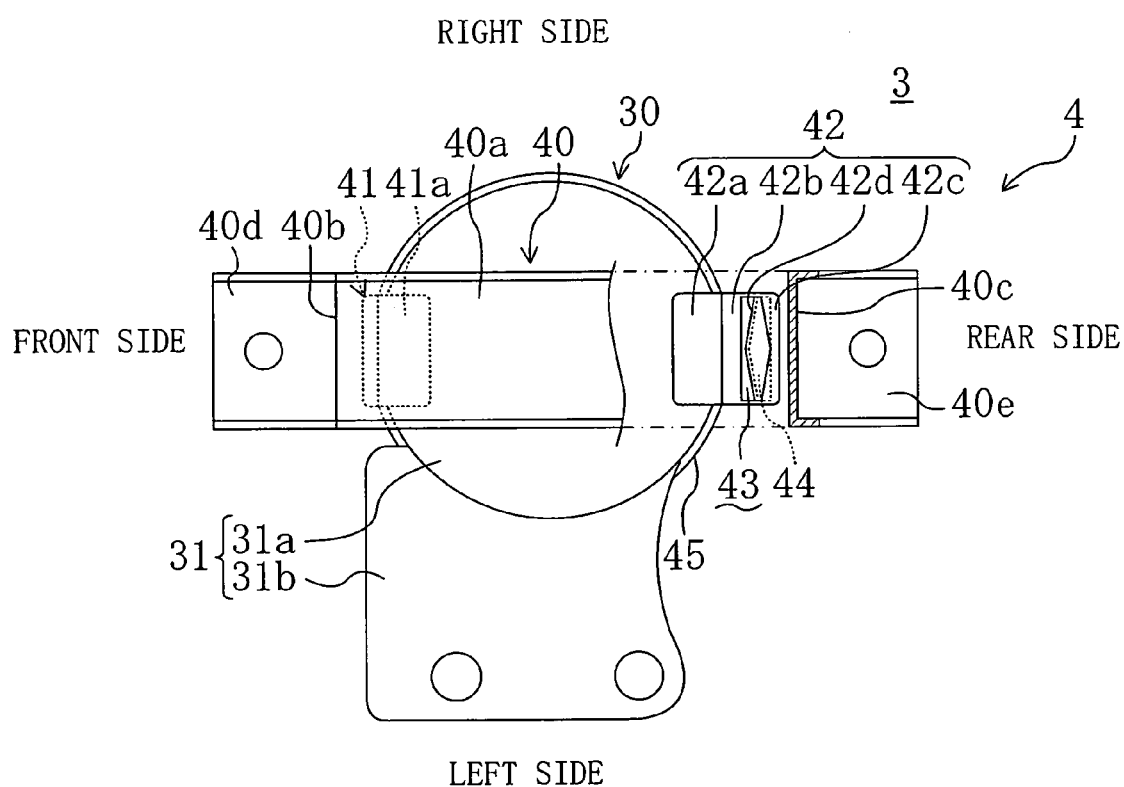
FIG. 8 is a view related to an example modification having a feature in a shape of a core body corresponding to FIG. 3.

In the embodiment 1 described above, a shape of the core body 44 of the rear side stopper rubber 42 is unnecessary to be in the shape of a rectangular plate and may be, for example as shown in FIG. 8, in the sectional shape where the core body 44 protrudes forward almost in the middle thereof in the vehicle body traverse direction as viewed from above. With such a shape adopted, the swell portion 42d swelling inward in the hollow portion 43 also protrudes forward in the middle thereof in the vehicle body traverse direction to thereby reduce a contact area of the swell portion 42d with the rubber block portion 42b located before the swell portion 42d in a state where the rear rubber stopper 42 is pushed in the vehicle body longitudinal direction; therefore causing the core body 44 to move with more of ease.

In the rear side stopper rubber 42, the hollow portion 43 is formed so as to pass therethrough vertically and the swell portion 42d is provided in the lower side thereof, while without limiting to this, the swell portion 42d can also be provided in the upper side of the hollow portion 43.

In the rear side stopper rubber 42, the core body 44 is embedded in the rubber wall portion 42c, while it can also be embedded in the rubber block portion 42b, with which construction the core body 44 revolves mainly relative to the stopper metal member 40.

Figure 9:
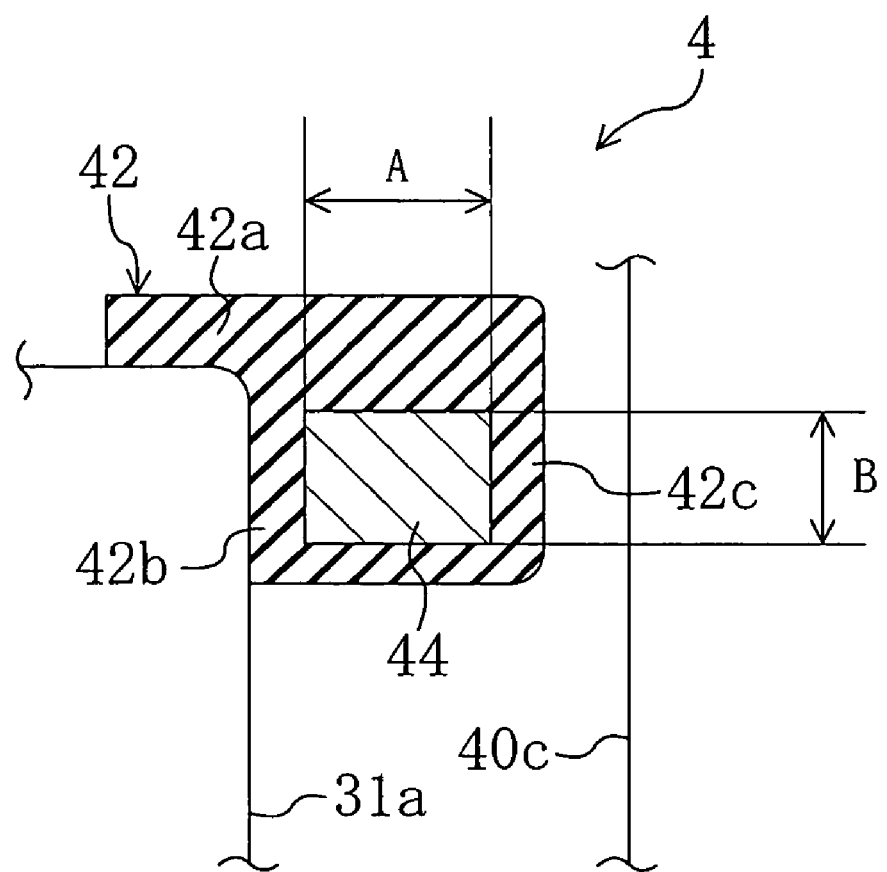
FIG. 9 is a view related to an example modification without providing a hollow portion corresponding to FIGS. 6A and 6B.
Figure 10:
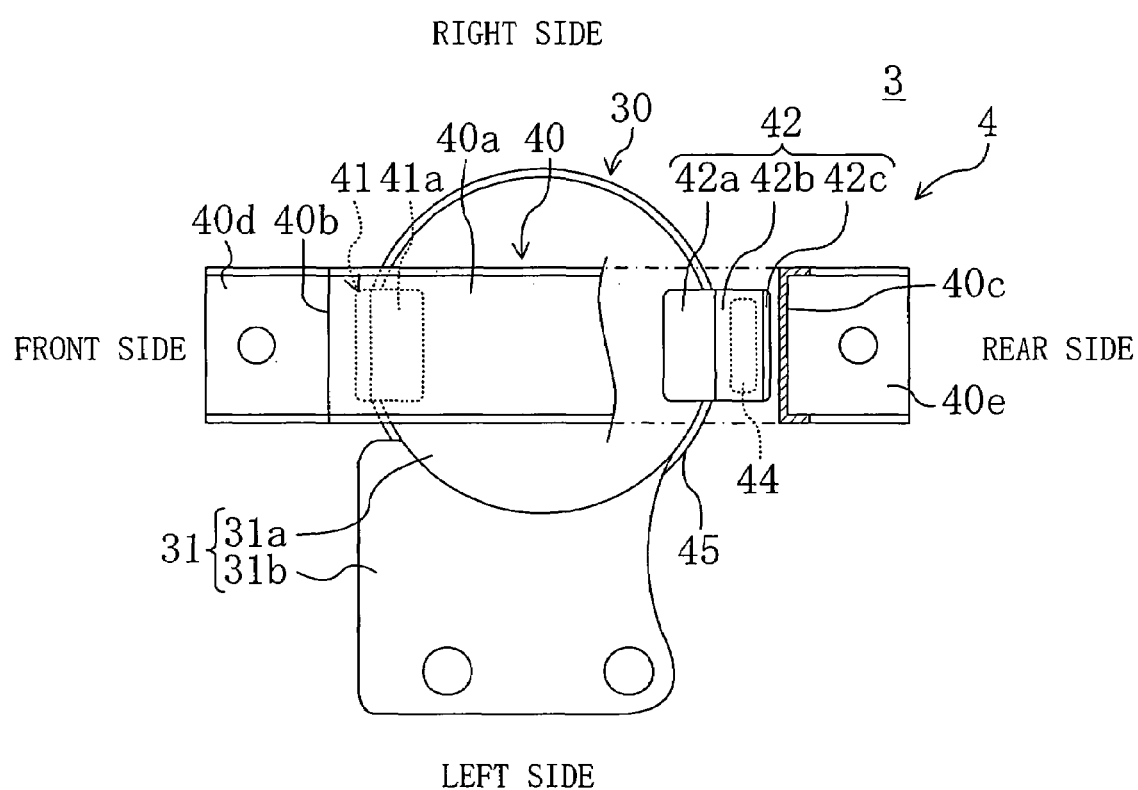
FIG. 10 is a view related to an embodiment 2 corresponding to FIG. 3.
Figure 11:
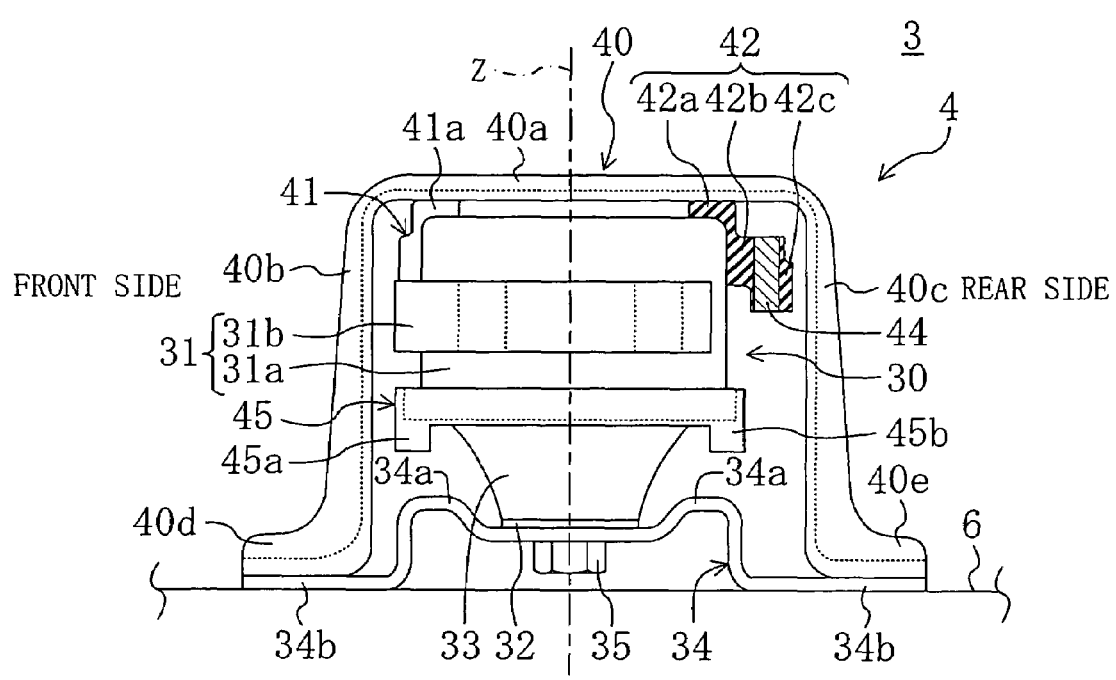
FIG. 11 is a view related to the embodiment 2 corresponding to FIG. 4.
Figure 12:
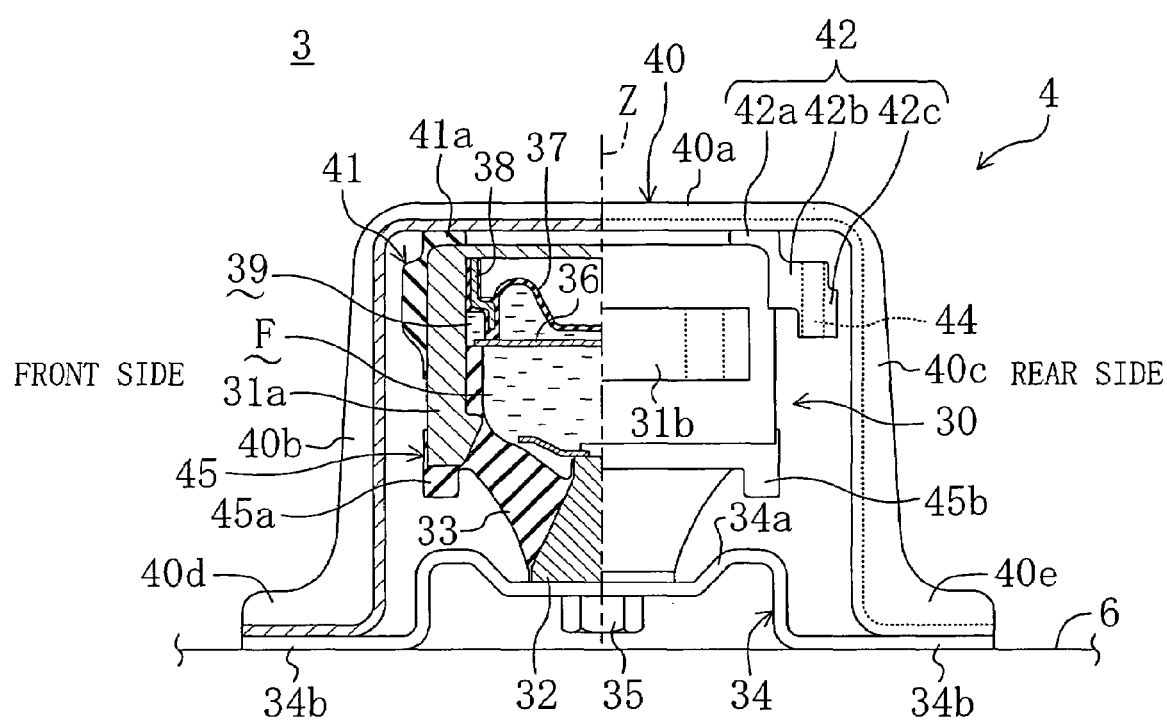
FIG. 12 is a view related to the embodiment 2 corresponding to FIG. 5.

In the rear side stopper rubber 42 of the embodiment 1, the core body 44 performs a link action in cooperation with the hollow portion 43, to which a construction is not necessary limited. That is, in a case where a length A of the core body 44 embedded in the stopper rubber 42 in the vehicle body longitudinal direction, as shown as a model in FIG. 9, is longer than a length B in the vertical direction (A≧B), the core body 44 revolves around an axis in the vehicle body traverse direction with comparative ease even if the core body 44 receives a compressive force in the vehicle body longitudinal direction; therefore, enabling an action and effect similar to those in the embodiment 1 to be acquired.

Embodiment 2

FIGS. 10 to 13 show an engine side mount 3 in the embodiment 2 of the invention of the present application. In the embodiment 2, as clear from the figures, no hollow portion 43 is provided in the rear side stopper rubber 42 of the oscillation limiting mechanism 4 and instead, a structure of the rubber portion in which the core portion is embedded is contrived so as to cause the core body 44 to perform a link action. Note that since a construction of the mount 3 in the embodiment 2 is the same as in the embodiment 1 except for details a structure of the rear side stopper rubber 42, the same marks are attached to the same constituents and descriptions thereof are omitted in the following passages of the specification.

Figure 13A:
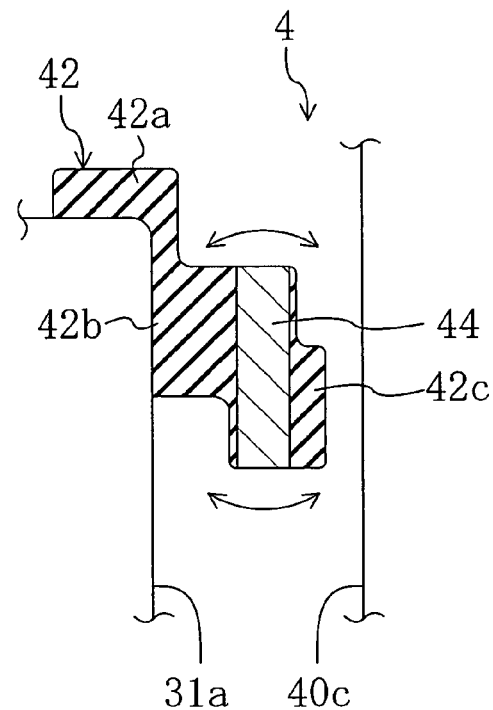
FIGS. 13A and 13B are views related to the embodiment 2 corresponding FIGS. 6A and 6B.
Figure 13B:
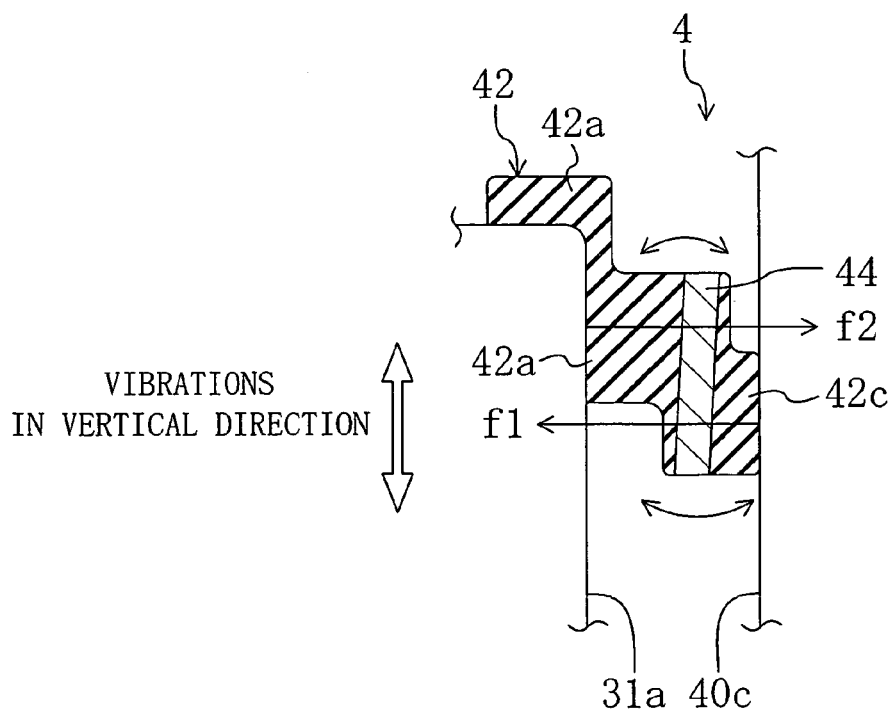

Then, description will be detailed of a structure of the rear side stopper rubber 42 with reference to FIGS. 13A and 13B. The rubber portion of the rear side stopper rubber 42 is, as shown with a section in FIG. 13A, constructed from a connecting rubber portion 42b (a connecting portion) formed so as to connect the core body 44 in the shape of a rectangular plate to the casing body 31a and a protruded rubber portion 42c (a protruded end portion) formed so as to protrude toward the rear side of the vehicle body from the rear side of the core body 44 and has the shape of a inverted L letter as a whole.

The connecting rubber portion 42b is formed as far as a length of about two-thirds of the core body 44 downward from the top end portion thereof and the upper side portion thereof in a relative sense including the central part of the core body 44 is connected to the casing body 31a. In other words, the core body 44 is separated from the casing body 31a in a portion in the side thereof lower than the connecting rubber portion 42b; thereby enabling the core body 44 to revolve (a link action) around an axis in the vehicle body traverse direction with comparative ease (for example, the core body 44 can revolve relative to the casing body 31a by an angle of about 1 degree or more in a state where no compressive force acts).

On the other hand, the protruded rubber portion 42c on the other side from the connecting rubber portion 42b is formed as far as a length of about two-thirds of the length of the core body 44 upward from the lower end portion thereof, that is in a portion in the lower side of the core body 44 in a relative sense including the central part thereof. That is, the protruded portion 42c and the connecting rubber portion 42b not only sandwich the core body 44 from the front and rear sides, and overlap one on the other in the vicinity of the central part of the core body 44 in the vertical direction, but are also shifted with respect to central position in the vertical direction to assume an offset arrangement.

With such a construction, in a case where the mount body portion 30 is displaced rearward as shown in FIG. 13B, and the rear end surface of the protruded rubber portion 42c, that is the rear end portion of the rear side stopper rubber 42, is brought into contact with the rear side leg portion 40c of the stopper metal member 40, whereby a pushing force in the vehicle body longitudinal direction is received, the pushing force in the vehicle body longitudinal direction can be received with certainty since the connecting rubber portion 42b and the protruded rubber portion 42c are overlapped one on the other in the vicinity of the central part of the rear side stopper rubber 42 in the vertical direction.

Since the connecting rubber portion 42b and the protruded rubber portion 42c sandwiches the core body 44 and are shifted in an offset arrangement in the vertical direction, an axial line of a pushing force f1 acting on the rear side stopper rubber 42 from the leg portion 40c of the stopper metal member 40 in the vehicle body longitudinal direction and an axial line of a reaction force f2 from the casing body 31a, as shown in the figure, does not coincide with each other, revolution of the core body 44, that is a link action of the core body 44, is urged by the couple of forces f1 and f2.

Therefore, in the embodiment 2 as well, when the rear side stopper rubber 42 receives a pushing force in the vehicle body longitudinal direction as described above, the stopper rubber 42 as a whole shear-deformed in the vertical direction by the link action of the core body 44 with comparative ease in a similar way to that in the embodiment 1 even in a state where the rubber portions 42b and 42c are compressed to be thereby hard in elastic deformation; thereby enabling displacement of the mount body portion 30 relative to the stopper metal member 40 in the vertical direction to be sufficiently allowed and further vibrations in the vertical direction to be effectively absorbed.

In the embodiment 2, besides, since a link action of the core body 44 is prompted by the pushing forces f1 and f2 in the vehicle body longitudinal direction, a rise in dynamic spring constant in the vertical direction can be more suppressed even as compared with that in the embodiment 1, and as shown with an alternate long and two short dashes line (IV) in FIG. 7B, a low dynamic spring characteristic in the vertical direction is not so much different from that when no load acts in the vehicle body longitudinal direction can be achieved even in a case where a predetermined pushing force (a set load) acts in the vehicle body longitudinal direction.

Note that in the rear side stopper rubber 42, various parameters such as a ratio of the connecting rubber portion 42b to the core body 44 in length in the vertical direction, a level of offset between the connecting rubber portion 42b and the protruded rubber portion 42c, a dimension ratio between a length and width of the core body 44 or the like can be altered, thereby enabling a balance between a support stiffness in the vehicle body longitudinal direction and an easiness in shear deformation in the vertical direction to be altered.

Example Modification

Figure 14A:
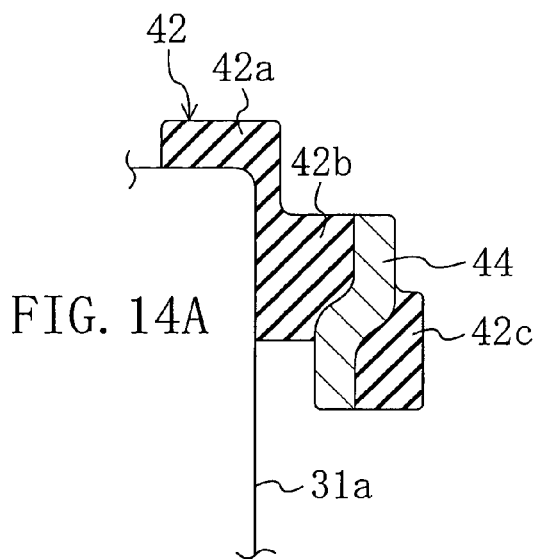
FIGS. 14A, 14B, 14C and 14D are views related to an example modification of the embodiment 2 corresponding to FIG. 13A.
Figure 14B:
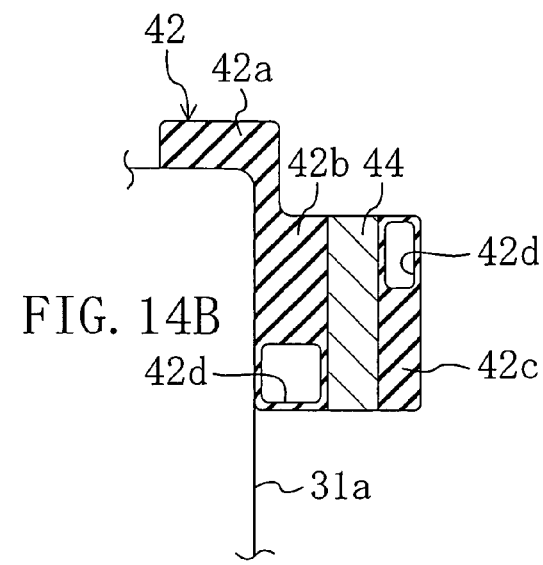

In the embodiment 2 as well, a shape of the core body 44 in the rear side stopper rubber 42 may not be in the shape of a rectangular plate and for example, may be in the shape of a crank in section as shown in FIG. 14A. A hollow portion 42d is formed in the interior of the rubber as shown in, for example, FIG. 14B instead of forming the rubber portions (the connecting rubber portion and the protruded portion) 42b and 42c before and after the core body 44 as shown in the FIGS. 14A and 13A shifted from each other in the vertical direction, and the centers of gravity of the rubber portions before and after the core body 44 or application points of forces in the rubber portions may be shifted from each other in the vertical direction.

Figure 14C:
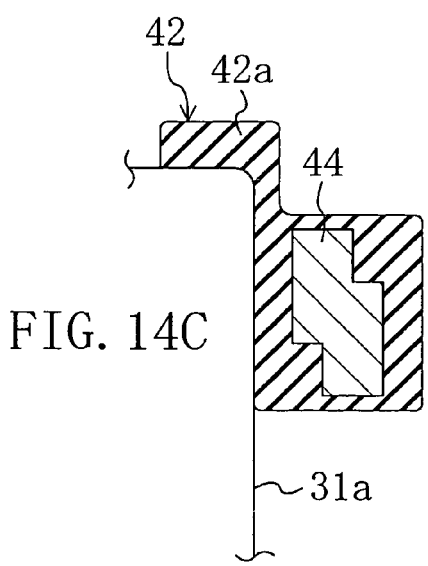
Figure 14D:
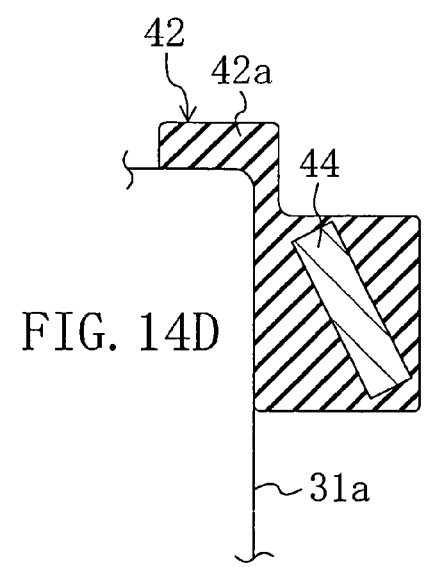

As shown in FIGS. 14C and 14D, the core body 44 in the rear stopper rubber 42 is formed in the shape of a crank in section as viewed in the vehicle body traverse direction and the front end portion and rear end portion may be shifted in an offset arrangement vertically or alternatively, the core body 44 may also be inclined so as to shift the front end side and rear end side thereof in position in the vertical direction.

Embodiment 3

Figure 15:
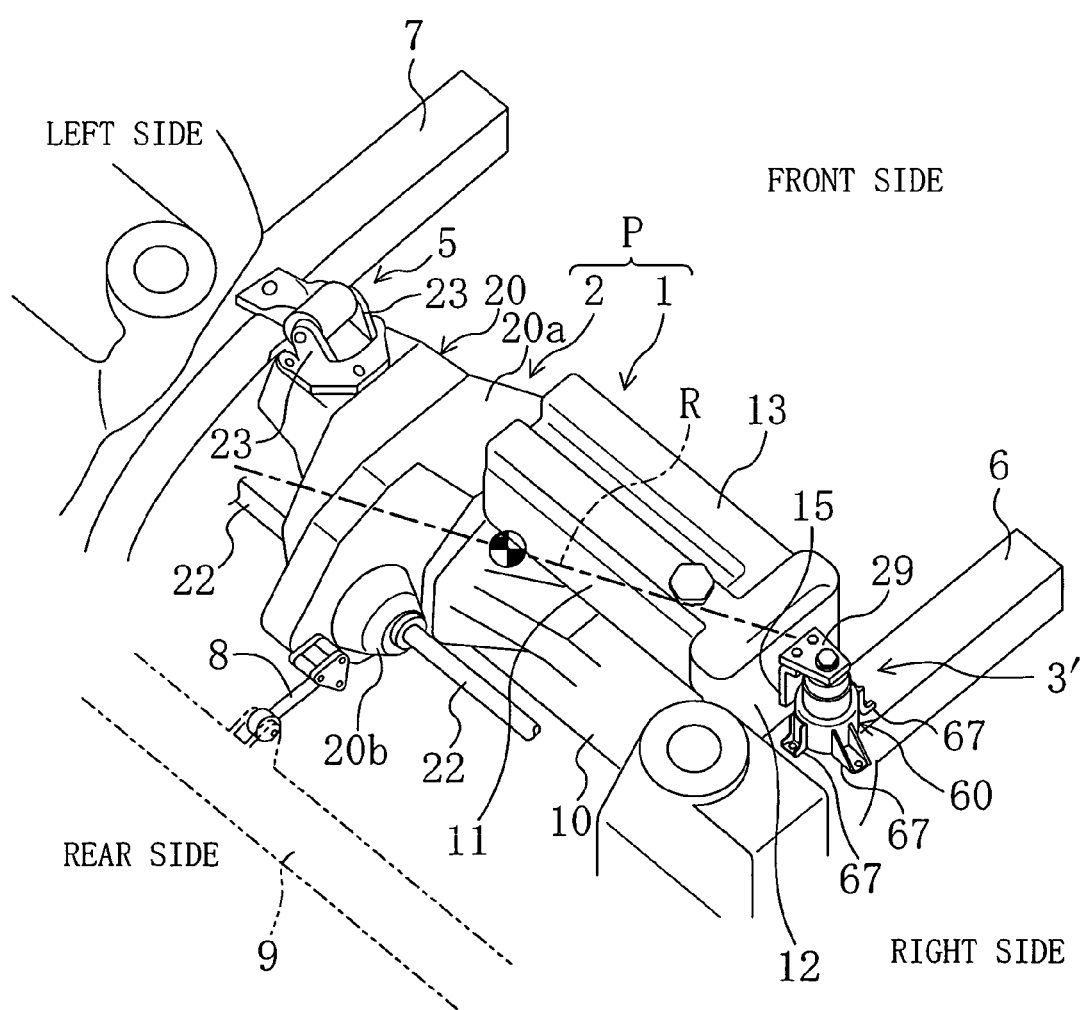
FIG. 15 is a view related to an embodiment 3 corresponding to FIG. 1.
Figure 16:
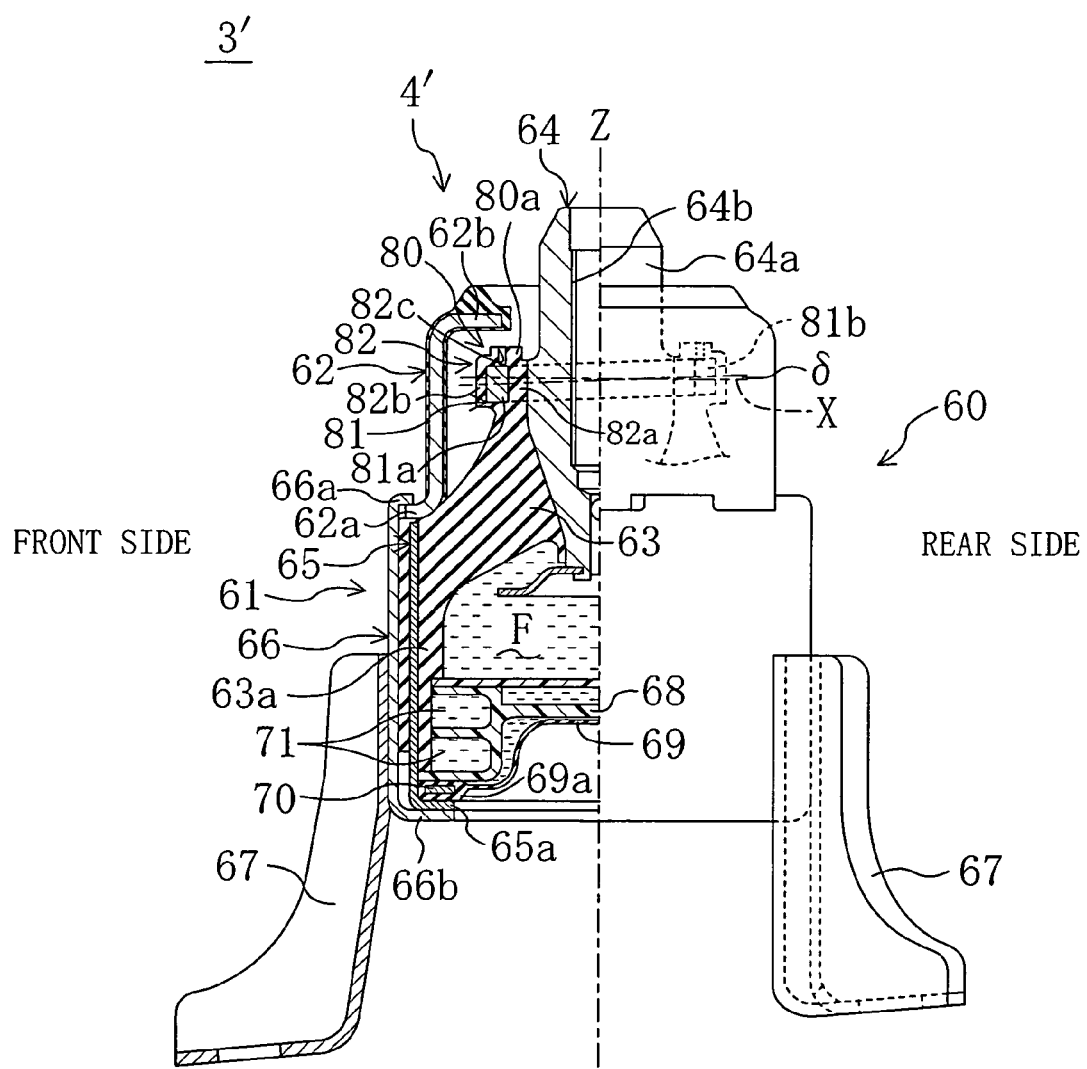
FIG. 16 is a view related to the embodiment 3 corresponding to FIG. 5.
Figure 17:
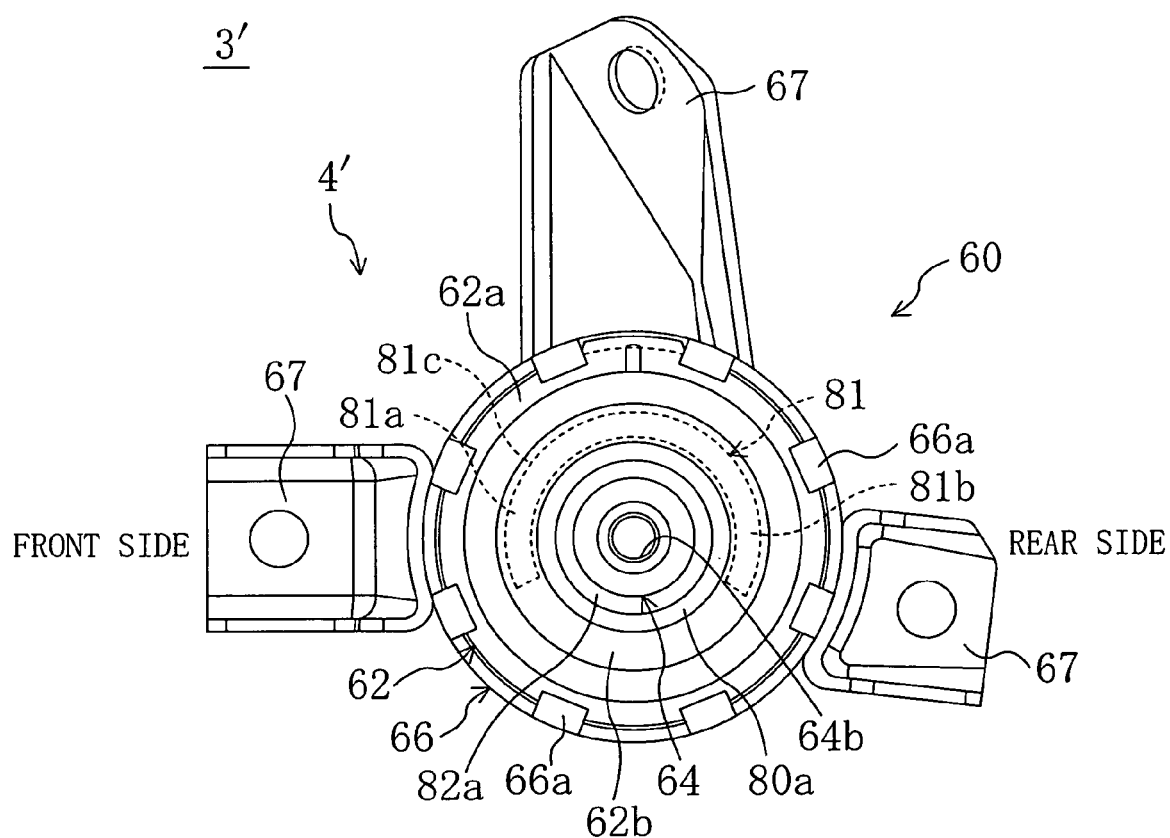
FIG. 17 is a view related to the embodiment 3 corresponding to FIG. 3.

FIGS. 15 to 17 show the embodiment 3 of the invention of the present application and, as shown in FIG. 16, especially in an engine side mount 3' of the embodiment 3, a mount body portion receiving a static load of the power plant P is disposed in a construction inverted upside down in the vertical direction from the constructions in the embodiment 1 and 2, wherein a metal casing 60 is connected to the vehicle body, while on the other hand, a connecting metal member 64 is connected to the power plant side. Note that an overall construction of the engine mount system of the embodiment 3 is the same as in the embodiments 1 and 2 except for a structure of the engine side mount 3'; therefore, the same marks are attached to the same constituents and descriptions of thereof are omitted.

Structure of Engine Side Mount

Figure 18A:
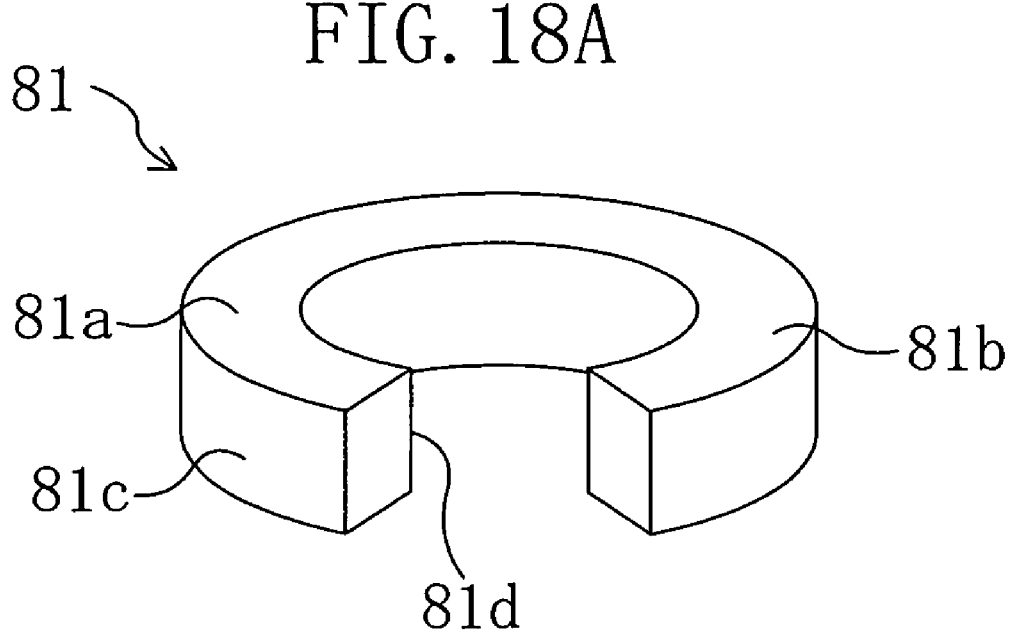
FIG. 18A is a perspective view showing a core body in an isolated state and FIG. 18B is an example modification having an outer circumferential surface in the shape of a circular arc in section.

Then, detailed description will be given of the structure of the engine side mount 3' with reference to FIGS. 16 and 17 and in addition, FIGS. 18 and 19. The casing 60 is, as shown in FIG. 16, constructed from: a support cylinder 61 in the shape of a cylinder supporting the connecting metal member 64 from below with a rubber elastomer 63 interposed therebetween; and a stopper metal member 62 having the shape of a cylinder slightly smaller in diameter than the support cylinder 61, a flange 62a formed in the lower end potion of which is fixed to the top end portion of the support cylinder 61, wherein the support cylinder 61 is fixed on a side frame 6 with three brackets 67, 67 and 67 fixedly attached to the outer circumference in the lower side of the casing 60 in a single piece.

The support cylinder 61 has a double structure constructed from an inner cylindrical member 65 in the inner side and an outer cylindrical member 66 in the outer side and plural (eight mails in the figure) nail portions 60a, 60a, . . . protruding upward from the top end edge of the outer cylindrical member 66 in the top end portion thereof are provided at a predetermined spacing in the peripheral direction and the nail portions 60a are bent toward the inner circumference side to thereby caulk the lower portion flange 62a on the top end edge of the inner cylindrical member 65. On the other hand, annular inner peripheral flanges 65a and 66b extending toward the inner circumference side are formed at the lower end edge portions of the inner cylindrical member 65 and the outer cylindrical member 66, and the inner peripheral flange 65a of the inner cylindrical member 65 is caulked on the inner peripheral flange 66b of the outer cylindrical member 66 from below.

The connecting metal member 64 is not only formed in the shape of inversion of a frustum of circular cone which is gradually tapered downward in the lower side portion, but also housed in the casing 60 and adhered to the upper portion of a rubber elestomer 63, while on the other hand, a portion in the upper side extends upward from the top surface of the casing 60 to serve as a connection shaft portion 64a in which a bolt hole 64b is formed in the shaft portion 64a so as to direct downward along the axial line Z from almost the central part of the top end surface thereof. Though not shown, an engine mounting bracket 29 (screwed on the top end portion of the mount bracket 15 which is shown only in FIG. 15) is fastened on the top end of the connecting metal member 64 with a mounting bolt screwed in the bolt hole 64*b*.

On the other hand, the inner circumference of the top portion of the rubber elastomer 63 is cure-adhered to the lower portion of the inversion of a frustum of circular cone of the connecting metal member 64 across the entire circumferential surface of the frustum of a circular cone. The outer circumference of the top portion of the rubber elastomer 63 is formed in the shape of a frustum of a circular cone tapered upward and an annular stopper portion 80 (described later) swelling outward is integrally provided at the top end thereof in a single piece. A rubber thin layer portion 63*a* is formed so as to extend downward from the lower end of the rubber elastomer 63 and the thin layer portion 63*a* is cure-adhered on the inner circumference of the lower end portion of the inner cylindrical member 65. Therefore, the connecting metal member 64 is supported from below by the casing 60 with the rubber elastomer 63 interposed therebetween.

An orifice plate 68 in the shape of a near disk with a large thickness is press-inserted from below on the inner circumferential surface of the thin layer portion 63*a* and a diaphragm 69 in the shape of a hat is disposed on the lower side of the orifice plate 68 so as to cover all of the lower side of the orifice plate 68 from below, whereby a lower end opening of the rubber elastomer 63 is liquid-tightly closed to form a cavity portion therein. That is, the diaphragm 69 is a filmy member made of rubber, a reinforcing plate 70 in the shape of an annular plate is embedded in an outer peripheral portion 69*a* with a relatively larger thickness, the outer peripheral portion 69*a* is superimposed on the upper surface of the inner peripheral flange 65*a* formed at the lower end of the inner cylindrical member 65, and the inner peripheral flange 65*a* are caulked on the inner peripheral flange 66*b* of the outer cylindrical member 66.

A shock-absorbing liquid is sealed in the cavity portion of the rubber elastomer closed by the diaphragm 69 and the cavity portion serves as a liquid chamber F for absorbing and alleviating vibrations. The internal space of the liquid chamber F is partitioned by the orifice plate 68 into two smaller spaces one on the other and the upper side space works as a pressure receiving chamber, while the lower side space works as an equilibrium chamber. An orifice passage 71 in a structure of a double herix is formed in the outer peripheral portion of the orifice plate 68 closed with the thin layer portion 63*a* of the rubber elastomer 63 adhered to the inner circumferential surface of the inner cylindrical member 65 of the casing 60, and the upper end of the orifice passage 71 faces and is open in the pressure receiving chamber, while on the other hand, the lower end of the orifice passage 71 faces ad is open in the equilibrium chamber.

Oscillation Limiting Mechanism

As shown in FIGS. 16 and 17, an oscillation limiting mechanism 4' is integrally provided in the engine side mount 3' in a single piece. That is, a stopper portion 80 (a vehicle body longitudinal force receiving member) constructed from a rubber member and others, as described above, is formed on the outer circumfrential side of the connecting shaft portion 64*a* of the connecting metal member 64 surrounded with the stopper metal member 62 of the casing 60, and, when the power plant P oscillates in the vehicle body longitudinal direction, is brought into contact with the stopper metal member 62 and receives a force in the vehicle body longitudinal direction.

Detailed description will be given of a structure of the stopper portion 80 with reference to FIGS. 16 to 19, wherein the rear side of the stopper portion 80 is different from the front side thereof only in position in height of the core body 81 and has the same function of the core body 81 revolving like a link as the front side thereof; therefore in FIG. 19, there is shown a section of only the front side of the stopper portion 80 and description is given of only the front side.

The stopper portion 80, as shown in FIGS. 16 and 19A, is constructed such that a metal core body 81 (see FIG. 18A) in the shape of a near rectangle in section and a near U letter as viewed from above is embedded in the interior of an annular rubber layer formed on the outer circumferential surface of the connecting metal member 64 integrally with the rubber elastomer 63 in a single piece, and disposed so as to surround the connecting shaft portion 64*a* across more than a half of the circumference from the right side wherein the front portion 81*a* and the rear portion 81*b* of the core body 81 are located at positions at the front side and rear side of the connecting shaft portion 64*a*.

Note that in the sectional view, as shown FIGS. 16 and 19A, a rubber portion 82*a* on the inner circumferential side of the core body 81 is thicker than a rubber portion 82*b* on the outer circumferential side thereof. An upward swell portion 80*a* raised upward is provided to the stopper portion 80 and by bringing the upward swell portion 80*a* into contact with the upper flange portion 62*b* of the stopper metal member 62 from below, upward movement of the connecting metal member 64 is limited there.

The core body 81 is obliquely inclined at a predetermined angle δ relative to a horizontal plane in the vehicle body longitudinal direction (in this embodiment, a plane X intersecting with the axial line Z of the mount 3 at a right angle) so that the front portion 81*a* is located lower than the rear portion 81*b*. This is because even in a case where a force in the vehicle body longitudinal direction acts to bring the stopper portion 80 into contact with the inner circumferential surface of the stopper metal member 62, the core body 81 is caused to perform a link action as described below while receiving a force in the vehicle body longitudinal direction, and for the link action of the core body 81, the core body 81 is preferably set so as to be inclined at an angle δ in the range of, for example, from about 3 to about 5 degrees.

In order to dispose the core body 81 is in an inclined state, the stopper portion 80 is formed in a way that the mount 3 is inverted upside down so that the connecting shaft portion 64*a* of the connecting metal member 64 assume a lower position and in this state, the rubber portion 82 and the rubber elastomer 63 are cure-molded while the core body 81 is supported by plural pin members (not shown) from below. Therefore, plural holes 82*c* being open upward are formed at sites corresponding to the pin members on the rubber portion 82. In order that the core body 81 is inclined (the front portion 81*a* is lower than the rear portion 81*b*), supporting heights of the plural pin members are set differently between the front side and rear side of the core body 81. Hence, in a case where the outer form of the rubber portion 82 of the stopper portion 80 is symmetrical in the vehicle body longitudinal direction, the depth of a hole 82*c* formed in the front side of the core body 81 is deeper than a hole 82*c* formed in the rear side thereof.

Note that a molding method for the stopper portion 80, without being limited to the above method, may also be performed in a state where the connecting metal member 64 takes a position of FIG. 16 (the connecting shaft portion 64a is positioned at an upper position). In this case, since the core body 81 is supported by the pin members from below, the holes 82c are formed so as to be open at the lower surface of the rubber portion 82.

With such an inclination of the core body 81 in the vehicle body longitudinal direction, in a case where, for example, in rapid acceleration or rapid deceleration of an automobile, the connecting metal member 64 is displaced forward as shown in FIG. 19B in company with oscillation of the power plant P and the outer circumferential portion of the stopper 80 is brought into contact with the inner circumferential surface of the stopper metal member 62 to receive a pushing force in the vehicle body longitudinal direction, the pushing force f1 from the stopper metal member 62 acts to the core body 81 obliquely relative thereto to thereby urge the core body 81 to perform revolution (a link action).

That is, even in a case where a pushing force in the vehicle body longitudinal direction acts on the stopper portion 80 to thereby compress the rubber portions 82a and 82b on the outer and inner circumferential sides of the core body 81 in the vehicle body longitudinal direction so as to be difficult in elastic deformation, the core body 81 in the inclined state revolves around an axis in the vehicle body traverse direction to thereby shear-deform the stopper portion 80 as a whole in the vertical direction with comparative ease. With such a construction, even when the stopper portion 80 receives a pushing force in the vehicle body longitudinal direction, the connecting metal member 64 on the power plant P side and the stopper metal member 62 on the vehicle body side are displaced relatively to each other with comparative ease, thereby enabling vibrations in the vertical direction to be absorbed effectively.

In the stopper portion 80, the outer circumferential surface 81c of the core body 81 (including the front and rear end surfaces of the core body 81) is almost parallel to the inner circumferential surface of the stopper metal member 62 and since when the outer circumferential surface of the stopper 80 is brought into contact with the inner circumferential surface of the stopper metal member 62, the outer circumferential surface 81c of the core body 81 pushes the rubber portion 82b in the outer circumferential side with a uniform force; therefore, enabling damage on the rubber portion 82b to be prevented.

Figure 18B:
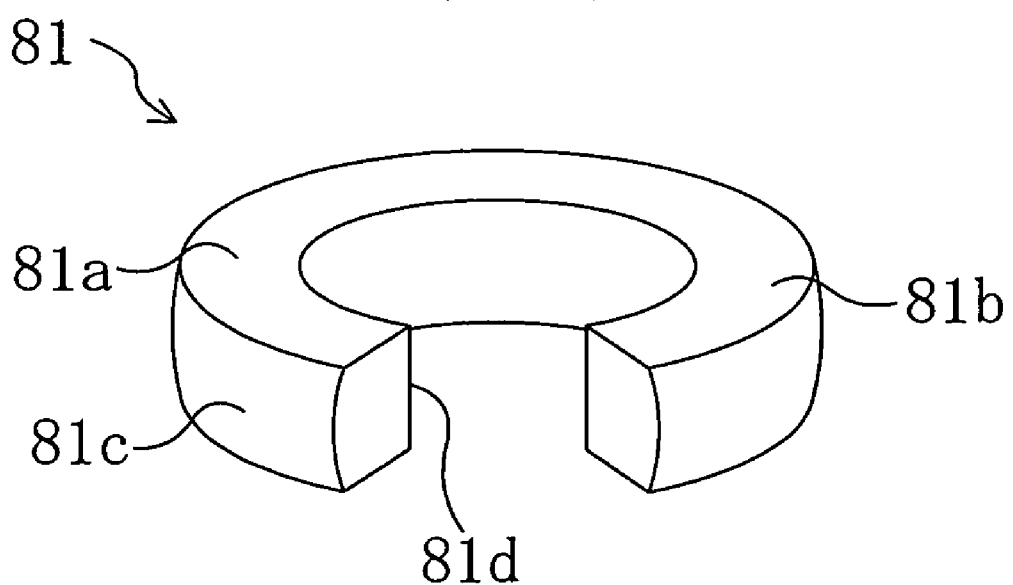

Note that, as shown in FIG. 18B, the outer circumferential surface 81c of the core body 81 may assume a surface with a circular arc in section swelled in the middle of the vertical width. In this case, not only can damage on the protruded rubber portion 82b be effectively prevented, but a link action of the core body 81 as described above is also occurs with extreme ease, thereby enabling vibrations in the vertical direction to be absorbed effectively. Herein, the outer circumferential surface 81c of the core body 81 almost in parallel to the inner circumferential surface of the stopper meal member 62 is a planar portion, while in a case where the outer circumferential surface 81c is in the shape of a circular arc in section swelled in the middle of the vertical width, the outer circumferential surface 81c is a curved surface portion having a section of a circular arc.

Therefore, even in a case where in the engine side mount 3' of the embodiment 3, the stopper portion 80, as described above, receives a pushing force in the vehicle body longitudinal direction and the rubber portions 82a and 82b assumes a state of being difficult in elastic deformation under an influence of a compressive force, the core body 81 performs a link action in a similar way to that in the first or embodiment 2 to thereby cause the stopper portion 80 as a whole to elastically deform in the vertical direction with comparative ease to thereby reduce a rise in dynamic spring constant in the vertical direction to a very small value; therefore, enabling transmission of vibrations in the vertical direction from the power plant P to the vehicle compartment to be suppressed and further increase in a surrounding sound in acceleration to be suppressed.

Since a link action of the core body 81 in the engine side mount 3' in the embodiment 3 is urged by a pushing force f1 in the vehicle body longitudinal direction in a similar manner to that in the engine side mount 3 of the embodiment 2, a rise in dynamic spring constant in the vertical direction can be reduced to the lowest value even in a state where a predetermined pushing force (a set load) acts in the vehicle body longitudinal direction as shown with an alternate long and two short dashes line (IV) in FIG. 7B.

In the embodiment 3, the stopper portion 80 constructed from the core body 81 formed in the shape of a near U letter as viewed from above and the rubber stopper 82 is provided so as to surround the connecting metal member 64 from the side all therearound to thereby exert a similar function to that of a torque for inclination in any sense in the vehicle longitudinal direction and to therefore, facilitate fabrication as compared with a case where separate members are provided at the front and rear side; thereby enabling a cost to be reduced.

Other Embodiments

A construction of the present invention is not limited to the embodiments described above, but includes various kinds of other embodiments. Therefore, while in any of the embodiments 1 to 3, the core body 44 or 81 is made of a metal, to which no specific limitation is applied, and may be made of any material, for example a resin, since a material of the core body 44 or 81 has only to be higher in stiffness than rubber.

In the embodiments 1 and 2, a hollow portion 43 is provided only in the rear side stopper rubber 42 of the stopper rubbers 41 and 42 in the front and rear sides and the core body 44 is embedded to thereby construct the oscillation limiting mechanism 4, to which no specific limitation is applied, while a construction can be adopted in which the front side stopper rubber 41 can be constructed in a similar way to that in the rear side.

In addition, while in each of the embodiments, the engine side mount 3 or 3' is of a liquid sealed type, to which no specific limitation is applied and needles to say that a construction may be adopted in which for example, the partition plate 36, the orifice plate 68, the diaphragms 37 and 69 and others are removed from the casings 30 and 60 of the mount body to thereby support a static load of the power plant P only by the rubber elastomers 33 and 63.

According to a vibration isolating mount device related to the present invention, as described above, oscillation of the power plant P in rapid acceleration or the like is restricted by the oscillation limiting mechanism 4 or 4' integrally provided to the mount 3 supporting the power plant P in a single piece and even in such a state, vibrations in the vertical direction can be effectively absorbed and increase in surrounding sound in acceleration and the like in the vehicle compartment can be suppressed; therefore, the vibration isolating mount device can be employed as a mount system for a FF automobile and is extremely useful especially in a pendulum mount.

What is claimed is:

1. A vibration isolating mount device for elastically supporting one of left and right end portions of a power plant mounted on a vehicle with a length direction of the power plant aligned in a traverse direction of a body of the vehicle, the vibration isolating mount device having an oscillation limiting mechanism for limiting oscillation of the power plant in a roll direction thereof, wherein the oscillation limiting mechanism has a receiving member for a force in a vehicle body longitudinal direction receiving at least a compressive force in the vehicle body longitudinal direction between a member of the vehicle body and a member of the power plant facing each other in the vehicle body longitudinal direction, the receiving member is constructed of: a rubber portion and a core body made of a material higher in stiffness than the rubber portion and provided integrally with the rubber portion in a single piece at least so as to be revolvable around an axis in the vehicle body traverse direction by a predetermined angle or more, a hollow portion is formed in the rubber portion of the receiving member at least so that the core body can be revolved around an axis in the vehicle body traverse direction, the hollow portion is formed so as to communicate with outside the rubber portion and at least one of inner walls in front and rear portions of the rubber portion enclosing the hollow portion has a swell portion swelling relatively into the hollow portion on one of upper and lower sides thereof, the core body being embedded at least in the swell portion.

2. The vibration isolating mount device of claim 1, wherein the hollow portion of the receiving member for a force in the vehicle body longitudinal direction is formed so as to pass through the rubber portion in the vertical direction and the swell portion is formed at a site relatively in the lower side in the hollow portion.

* * * * *